(12) United States Patent
El-Rafie

(10) Patent No.: US 6,968,394 B1
(45) Date of Patent: Nov. 22, 2005

(54) ASYMMETRIC SATELLITE-BASED INTERNET SERVICE

(75) Inventor: Khalid Monir A. El-Rafie, Subic Bay (PH)

(73) Assignee: Zaksat General Trading Co., WLL, Subic Bay (PH)

( * ) Notice: Subject to any disclaimer, the term of this patent is extended or adjusted under 35 U.S.C. 154(b) by 0 days.

(21) Appl. No.: 09/532,804

(22) Filed: Mar. 21, 2000

Related U.S. Application Data

(63) Continuation of application No. PCT/US98/20164, filed on Sep. 22, 1998.

(60) Provisional application No. 60/080,586, filed on Apr. 3, 1998, provisional application No. 60/065,424, filed on Nov. 13, 1997, provisional application No. 60/059,709, filed on Sep. 22, 1997.

(51) Int. Cl.[7] ............................................. G06F 15/16
(52) U.S. Cl. ...................... 709/245; 709/250; 709/249; 455/3.01
(58) Field of Search ................................ 709/245, 250, 709/249, 238; 370/401; 455/3.01; 725/123, 725/118

(56) References Cited

U.S. PATENT DOCUMENTS

| | | | |
|---|---|---|---|
| 5,511,079 A | | 4/1996 | Dillon |
| 5,652,795 A | | 7/1997 | Dillon et al. |
| 5,659,615 A | | 8/1997 | Dillon |
| 5,699,384 A | | 12/1997 | Dillon |
| 5,727,065 A | | 3/1998 | Dillon |
| 5,850,218 A | * | 12/1998 | LaJoie et al. .................. 725/45 |
| 5,852,721 A | * | 12/1998 | Dillon et al. ................ 709/217 |
| 5,867,660 A | * | 2/1999 | Schmidt et al. ............. 709/227 |
| 5,968,129 A | | 10/1999 | Dillon et al. |
| 5,995,725 A | * | 11/1999 | Dillon ......................... 709/203 |
| 5,995,726 A | | 11/1999 | Dillon |
| 6,016,316 A | * | 1/2000 | Moura et al. ................ 370/389 |
| 6,016,388 A | | 1/2000 | Dillon |
| 6,038,594 A | * | 3/2000 | Puente et al. ............... 709/217 |
| 6,041,356 A | * | 3/2000 | Mohammed ................ 709/227 |
| 6,067,561 A | | 5/2000 | Dillon |
| 6,078,961 A | * | 6/2000 | Mourad et al. ............. 709/235 |
| 6,115,750 A | | 9/2000 | Dillon et al. |
| 6,125,184 A | | 9/2000 | Dillon et al. |
| 6,131,160 A | | 10/2000 | Dillon et al. |
| 6,141,333 A | * | 10/2000 | Chavez, Jr. .................. 370/338 |
| 6,161,141 A | | 12/2000 | Dillon |
| 6,205,473 B1 | * | 3/2001 | Thomasson et al. ......... 709/217 |
| 6,205,485 B1 | * | 3/2001 | Kikinis ........................ 709/231 |
| 6,208,656 B1 | * | 3/2001 | Hrastar et al. .............. 370/401 |
| 6,215,873 B1 | | 4/2001 | Dillon et al. |
| 6,307,937 B1 | | 10/2001 | Dillon et al. |
| 6,321,268 B1 | | 11/2001 | Dillon et al. |
| 6,331,979 B1 | | 12/2001 | Dillon et al. |
| 6,337,911 B1 | | 1/2002 | Dillon |
| 6,338,131 B1 | | 1/2002 | Dillon |

(Continued)

FOREIGN PATENT DOCUMENTS

EP 734140 9/1996

(Continued)

OTHER PUBLICATIONS

Baras et al., "Fast Asymmetric Internet Over Wireless Satellite-Terrestrial Networks," Nov. 5, 1997, MILCOM 97 Proceedings, vol. 1, pp. 372-377.*

(Continued)

Primary Examiner—Bradley Edelman
(74) Attorney, Agent, or Firm—Banner & Witcoff, Ltd.

(57) ABSTRACT

An asymmetric access satellite based system having improved features including multicasting, master and slave cache facilities, roaming, and flexible IP packet routing.

47 Claims, 20 Drawing Sheets

U.S. PATENT DOCUMENTS

| | | | |
|---|---|---|---|
| 6,351,467 | B1 | 2/2002 | Dillon |
| 6,370,571 | B1 * | 4/2002 | Medin, Jr. ................. 709/218 |
| 6,377,561 | B1 * | 4/2002 | Black et al. ................ 370/330 |
| 6,385,727 | B1 | 5/2002 | Cassagnol et al. |
| 6,430,233 | B1 | 8/2002 | Dillon et al. |
| 6,438,666 | B2 | 8/2002 | Cassagnol et al. |
| 6,473,793 | B1 | 10/2002 | Dillon et al. |
| 6,505,255 | B1 * | 1/2003 | Akatsu et al. .............. 709/239 |
| 6,519,651 | B1 | 2/2003 | Dillon |
| 6,546,488 | B2 | 4/2003 | Dillon et al. |
| 6,571,296 | B1 * | 5/2003 | Dillon ........................ 709/250 |
| 6,600,730 | B1 | 7/2003 | Davis et al. |
| 6,633,547 | B1 * | 10/2003 | Akatsu et al. .............. 370/255 |
| 6,658,010 | B1 * | 12/2003 | Enns et al. ................. 370/401 |
| 6,658,463 | B1 | 12/2003 | Dillon et al. |
| 6,671,741 | B1 | 12/2003 | Dillon |
| 6,701,370 | B1 | 3/2004 | Dillon |
| 6,785,288 | B1 * | 8/2004 | Enns et al. ................. 370/401 |
| 2002/0007493 | A1 * | 1/2002 | Butler et al. ................ 725/109 |

FOREIGN PATENT DOCUMENTS

| | | |
|---|---|---|
| WO | WO 95/34153 | 12/1995 |
| WO | WO 97/20413 | 5/1997 |

OTHER PUBLICATIONS

Arora et al., "Asymmetric Internet Access Over Satellite-Terrestrial Networks," 1995, American Institute of Aeronautics and Astronautics, Inc., pp. 1-7.*

Duros, "Modified Document: Supporting Unidirectional Paths in the Internet," Jun. 1996, from www.udcast.com/pipermail/udlr/1996q2/000008.html, pp. 1-6, as printed.*

Johnston, "DynCorp to Offer Feds Satellite Access to Net," May 17, 1999, Federal Computer Week, vol. 13, Iss. 15, pp. 44ff.*

Rocci et al., "How Do You Manage 'Internet in the Sky'," Nov. 15, 1998, America's Network, vol. 102, Iss. 22, pp. 32ff.*

Stagarescu, "Master's Thesis: Bandwidth Allocation to Interactive Users in DBS-Based Hybrid Internet," 1998, Center for Satellite and Hybrid Communication Networks, pp. i-viii, 1-64.*

Romkey, "A Nonstandard for Transmission of IP Datagrams Over Serial Lines: SLP," Jun. 1988, pp. 1-6 of printou.*

Greco, "Satellite: Boosting Internet Performance," Apr. 1997, Telecommunications, vol. 31, Iss. 4, pp. 44ff.*

Hower, "MPEG-2 Video Satellite Transmission Using ATM Techology," Sep. 1996, International Broadcasting Convention, pp. 466-470.*

"ICP/IP Performance over Satellite Links", Craig Patridge and Timothy J. Shepard, IEEE Network, Sep./Oct. 1997.

"Internet Services via Direct Broadcast Satellites", Horst D. Clausen, Bernhard Nocker, Institute for Computing Sciences and Systems Analysis, University of Salzburg, Austria, pp. 468-475.

"The Internet In Space: Problems & Solutions", Lee Goldberg, *Computer*, IEEE Society, Long Beach, CA vol. 30, No. 2, Feb. 1, 1997, pp 15-16.

* cited by examiner

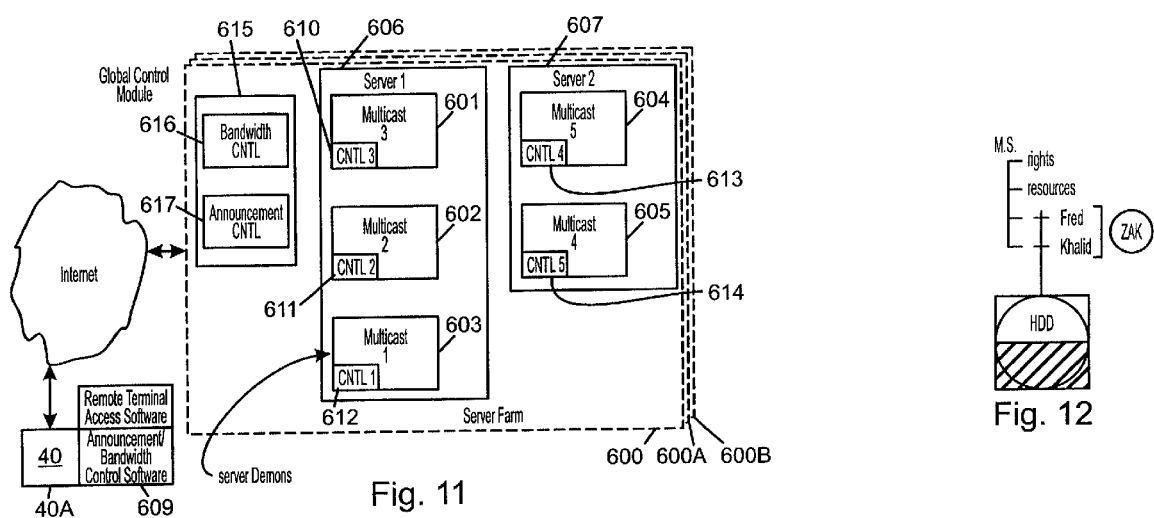
Fig. 11
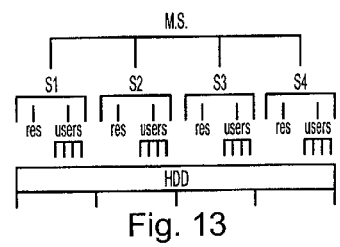
Fig. 12
Fig. 13

ASYMMETRIC SATELLITE-BASED INTERNET SERVICE

This application is a continuation application of pending application PCT/US98/20164, filed Sep. 22, 1998; U.S. Provisional Application Ser. No. 60/059,709, filed Sep. 22, 1997, now abandoned, U.S. Provisional Application Ser. No. 60/065,424, filed Nov. 13, 1997, now abandoned, and U.S. Provisional Application Ser. No. 60/080,586, filed Apr. 3, 1998, now abandoned, all entitled Asymmetric Satellite-Based Internet Service and having the same inventor as the present application, all herein incorporated by reference.

FIELD OF THE INVENTION

The present invention is directed generally to systems and methods for asymmetric satellite networks, and, more particularly, to systems and methods for providing asymmetric satellite-based services such as Internet services.

DESCRIPTION OF THE RELATED ART

Conventionally, asymmetric satellite Internet service may be provided as shown in FIG. 17. Such a system is described in Arora, et al., *Asymmetric Internet Access Over Satellite-Terrestrial Networks*, the American Institute of Aeronautics and Astronautics, 1985. In the conventional system 500 shown in FIG. 17, the hybrid terminal 501 includes an application 502 which utilizes a customized TCP/IP stack 503. The customized TCP/IP stack performs a spoofing function in which a request for an Internet destination of "company.com" of an intended Internet host 513 is encapsulated in a spoofing packet having a source address of the hybrid terminal 501 and a destination address of the hybrid gateway 511. The packet is thereafter sent to the hybrid gateway 511 via a unified customized driver 504, a modem 506, the public switched telephone network (PSTN) 507, an ISP 508, and the Internet 509 via a first path 510. The hybrid gateway 511 then unencapsulates the original request. Thereafter, a new request is issued corresponding to the original request. The new request goes back out across the Internet 509 via a second path 512 to access the Internet host 513. Data returned from the Internet host 513 is sent back to the hybrid gateway 511 via the Internet again across the second path 512. The hybrid gateway 511 then outputs the data received from "company.com" back to the hybrid terminal 501 via the LAN 514, the Satellite Gateway 516, the uplink 517, the satellite 518, the downlink 519, the satellite card 505, the customized driver 504, and the customized TCP/IP stack 503.

The conventional system 500 is problematic for a number of reasons. For example, the TCP/IP driver on the hybrid terminal 501 must be customized and the standard "Windows" driver cannot be utilized. Further, the hybrid gateway 511 creates a bottleneck. Each request to a host must pass through the Internet to the hybrid gateway 511, be reconfigured, pass back out through the Internet to the Internet host 513, return across the Internet back to the hybrid gateway 511, proceed across a LAN 514, through a satellite gateway 515 and then back to the hybrid terminal. Accordingly, the conventional systems are difficult to install and maintain and suffer from performance problems.

SUMMARY OF THE INVENTION

One or more aspects of the present invention solve one or more of the above problems and/or provide improved techniques for implementing asymmetric Internet access.

In one aspect of the invention, the asymmetric satellite system is implemented by assigning Internet IP addresses belonging to a centralized uplink center to plurality of users on the system. Requests from the users to an Internet host are routed back to the uplink center and transmitted back to the terminal devices of each of the users via satellite.

In another aspect of the invention, requests to Internet hosts which are already stored in cache in the uplink center are automatically routed directly to the uplink center—bypassing the host.

In yet another aspect of the invention, some requests made to the ISP are serviced locally by the ISP (e.g., mail requests) in a symmetric manner, while other requests such as FTP requests are returned asymmetrically via satellite through the uplink center.

In still further aspects of the invention, the ISP has a plurality of router levels with a mail server connected to a first hop router. Requests which are not serviced by the first level router are forwarded to a second hop router. Requests at the second level router having a source IP address of the uplink center are routed to the Internet.

In still further aspects of the invention, an asymmetric terminal provides proxy service to a corporate LAN.

In yet further aspects of the invention, the terminal device provides Internet access to a head-end of a cable network.

In yet further aspects of the invention, asymmetric Internet access is provided to each of a plurality of terminal devices coupled to a cable network as the return path in the asymmetric network.

In yet further aspects of the invention, asymmetric Internet access is provided to an ISP whereby a mini-ISP may be set-up with normal telephone connection to a network operations center and the return path includes a much higher speed connection, e.g., a satellite link.

In yet further aspects of the invention, a settop box coupled to a cable network may have asymmetric Internet access by coupling a satellite dish to the cable settop box. Thus, the settop box provides dual mode connectivity between the satellite antenna and the cable network. In this manner, a single MPEG decoder may provide multiple functions. Additionally, the settop box may be able to seemlessly integrate multiple channels, virtual pages, in a single interactive program guide structure.

These and other features of the invention will be apparent upon consideration of the following detailed description of preferred embodiments. Although the invention has been defined using the appended claims, these claims are exemplary in that one or more aspects of the invention are intended to include the elements and steps described herein in any combination or subcombination. For example, it is intended that each of the above aspects of the invention may be used individually and/or in combination with one or more other aspects of the invention. Accordingly, there are any number of alternative combinations for defining the invention, which incorporate one or more elements from the specification, including the description, claims, aspects of the invention, and/or drawings, in various combinations or subcombinations. For example, although satellite broadcasts are described in many of the embodiments, microwave transmissions may also be utilized. Accordingly, it will be apparent to those skilled in Internet theory and design, in light of the present specification, that alternate combinations and subcombinations of one or more aspects of the present invention, either alone or in combination with one or more elements and/or steps defined herein, may constitute alternate aspects of the invention. It is intended that the written description of the invention contained herein cover all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by the way of example, and not by way of limitation with regard to the claimed invention.

FIGS. 11–13 are diagrams illustrating the operation of multicasting remote control and supervisory functions in accordance with the present invention.

Referring to FIG. 1, an asymmetric access system 1 includes a terminal device 2 which may be any suitable terminal device such as a personal computer, a server, and/or a settop device. The terminal device 2 may include a storage device 20 such as a hard disk, DVD storage, or WORM storage. A driver 22 may interface the storage device 20 with one or more applications 7. The applications 7 may, for example, include an Internet browser, e.g., "Explorer" running on top of a standard TCP/IP protocol stack 8 e.g., the protocol stack in "Windows 95". The TCP/IP stack 8 in the terminal device 2 need not be modified or customized to accommodate the present asymmetric access system 1. The terminal device 2 preferably includes a unified driver 9. The unified driver 9 may interface to any number of physical communication interfaces such as a satellite card 19 and a modem 10. The modem 10 may be variously configured to include any modulation scheme. The modem may be coupled to a data link 12 such as the public switched telephone network (PSTN) and/or a cable network. The modem 10 may be coupled through the data link 12 to an ISP 13 which may be coupled to the Internet 21. Alternately, the modem 10 may interface directly to the NOC 4 via the PSTN 12. The Internet 21 may have one or more Internet Hosts 5 located at various server addresses. The Internet 21 may also be coupled to a network operation center 4. The network operation center 4 may be coupled via uplink 17 to a satellite 6 which may, in turn be coupled to a satellite downlink 18. The satellite downlink 18 may be broadcast to a number of locations such as to the satellite card 19 of the terminal device 2. The terminal device 2 may have a co-located satellite receiver 23.

Figure 1:
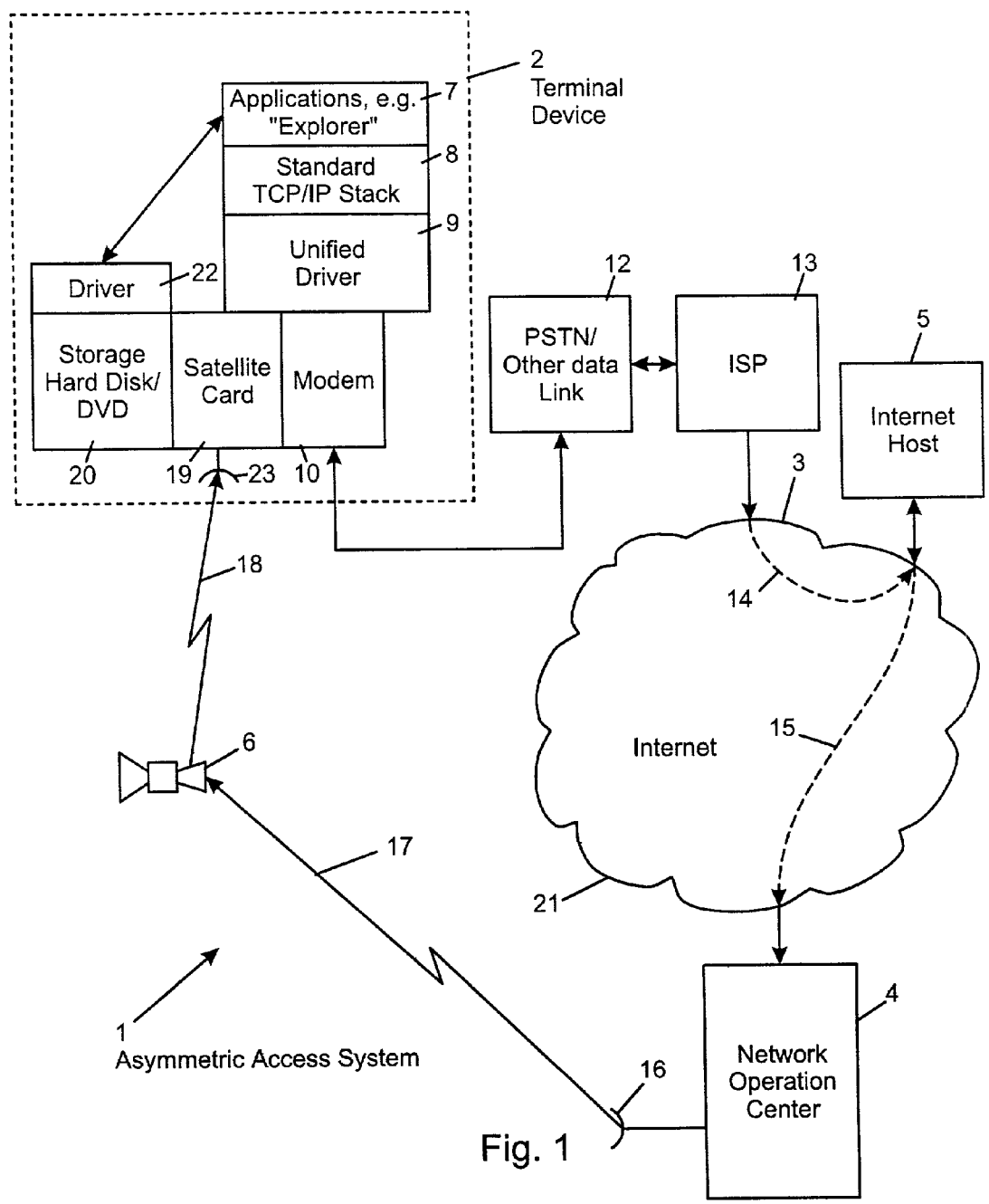
FIGS. 1–2 are block diagrams of different embodiments of the asymmetric satellite system in accordance with aspects of the present invention.

In operation, each terminal device 2 includes a source IP address which corresponds to one of the network registered IP addresses of the network operation center (NOC) 4.

The Internet IP addresses are divided into different network classes. Class A addresses have the first octet of the Internet address between 0 and 127. The network address is the first octet, with the host address being the next three octets. Class B addresses have the first octet of the Internet address between 128 and 191. The network address for class B service includes the first two octets, with the second two octets defining the host addresses. For class C, the first network address octet is between 192 and 223. The network address includes the first three octets. Only a single octet is used for the host address. For Class D, the first octet ranges between 224 and 239 with the next three octets also used to define the network. For class D, there is no host. Class D is exclusively reserved for multicasting. All of the current Internet addresses in classes A, B, and C have been distributed to the Internet providers on the Internet backbone. These service providers include UUNET, Sprint, MCI and AT&T. Accordingly, an IP address range must be reserved from one of these providers so that the NOC 4 has an associated address range to utilize with clients using the high speed transmission services of the NOC 4. The IP addresses reserved for NOC users may be assigned directly to the user on a static basis or assigned to the ISP 13 and thereafter assigned to the individual users on a dynamic basis. The dynamic assignment of IP addresses reserved for the NOC allows for roaming as discussed below with regard to FIG. 15.

The IP assignment to each individual terminal can be done on either a static or dynamic basis between the Internet service provider 13 and the terminal device 2. In a static arrangement, each terminal device is assigned an Internet IP address which corresponds to one of the addresses of the NOC 4. Alternatively, the ISP may dynamically assign an IP address of the NOC 4 to each terminal. Where dynamic IP address assignment are utilized, the ISP 13 may configure its server to include a database of each asymmetric access user such that asymmetric IP addresses of the NOC 4 are assigned to asymmetric users based on a user ID. Alternately, all callers on certain designated phone lines may be assumed to be asymmetric users and assigned an IP address of the NOC 4. In this manner, only asymmetric access users are allocated NOC IP addresses; whereas other users, which are not configured for the asymmetric satellite transfer, are allocated IP addresses which belong to the ISP and not the NOC 4.

The IP ranges for class A, B, and C networks are divided among each point-of-presence (POP) on the Internet backbone network. Within that particular range, each point-of-presence may assign a subset of that range to various Internet service providers or networks that are attached to the point-of-presence router. The Internet service providers, in turn, may provide a subset of the range to individual companies and to users on their network on a dynamic and/or static basis. In this way, an individual user may be assigned a dynamic or static IP address from the ISP. Alternatively a company may be assigned a range of IP addresses which are assigned to one or more LANs, e.g., a LAN within an individual company. The individual company may also have a number of other IP addresses which are not known and not assigned over the Internet and have only local significance within the company.

The addresses of local significance are not broadcast IP addresses, and are only valid locally, e.g., on the LAN. The IP addresses on the LAN which are broadcast addresses are conventionally a subset of the range of IP addresses assigned to the point-of-presence router utilized by the ISP. The point-of-presence router may, for example, be a router operated by AT&T and which runs BGP protocol.

A broadcast IP address from a local company LAN or from an individual Internet user may be sent from the terminal device 2 to the ISP, to the point-of-presence, and across the Internet backbone to any destination such as Internet host 50 (e.g., cnn.com). Thereafter, the Internet host 5 (e.g., cnn.com) can route the reply using the source address of the IP packet.

One aspect of the present invention involves assigning an IP address which belongs to the network operations center 4 to each asymmetric subscriber on the Internet regardless of whether that asymmetric subscriber is on a different point-of-presence connected ISP. Thus, regardless of the location of the individual Internet subscriber, the subscriber may be dynamically and/or statically assigned an IP source address corresponding not to the ISP 13 but to the NOC 4. In this manner, an asymmetric satellite system user issues a request to a Internet host 5, e.g., cnn.com, with the source address being one assigned to the NOC 4. Thus, when the request from the asymmetric satellite subscriber is issued to the Internet host 5, the return path from the Internet host 5 may be automatically routed to the NOC 4 for rebroadcast via satellite 6 directly to the terminal device 2. In this manner, the asymmetric subscriber has immediate access to the Internet host 5 with a single Internet transaction and without going through a hybrid gateway as in the conventional system. Thus, the asymmetric access system 1 eliminates an entire Internet connection delay.

The present system is advantageous over conventional systems in that information is returned from one or more Internet hosts directly to the NOC 4. Since the NOC 4 may be directly connected to a point-of-presence router, and re-broadcasts are made directly to the end user, cable headend, and/or ISP, delays on the return path are minimized.

The present system is further advantageous because a specialized TCP/IP stack is not required. Thus, the user can utilize the standard windows 95 TCP/IP stack and a conventional Internet browser. Modifications to the terminal device 2 are simply the loading of a satellite card 19 into an expansion slot and loading of the unified driver 9. Thus, the satellite card and unified driver can easily be integrated into any terminal device 2 regardless of the operating system. The specialized IP address assignment may be made by simply connecting to an authorized ISP having one or more IP addresses associated with the NOC 4. This is a major and significant improvement over the customized software and hybrid gateway required for conventional systems.

In the present system, the user only needs to be provided with one of the IP addresses of the NOC by the ISP. In other words, the asymmetric system may be fully accomplished by simply assigning an IP address to an individual subscriber which belongs to a range allocated to the NOC 4 of an asymmetric satellite provider. A method of accomplishing the asymmetric routing scheme may include initiating a web request to an Internet host 5 with a return IP address belonging to a different point-of-presence than the originating request.

Spoofing of the NOC 4 may be prevented by inserting a digital signature tag, such as an encrypted ID, into each request issued to the NOC 4. In these embodiments, the NOC 4 uses a router (e.g., a CISCO router) to perform filtering on incoming packets to ensure only packets with an approved digital signature and/or IP range are accepted into the NOC 4 for later processing. This security provision prevents the NOC 4 from being overrun by spoofed packets.

Testing of the invention has shown through-put rates for individual users in excess of 1.5 megabits per second. Due to economic considerations, it may be desirable to limit an individual user's throughput to a predetermined committed information rate (CIR) such as 200 and/or 400 kilobits per second, per user. Assuming that no other users are using the bandwidth, the user may receive the entire bandwidth.

Figure 2:
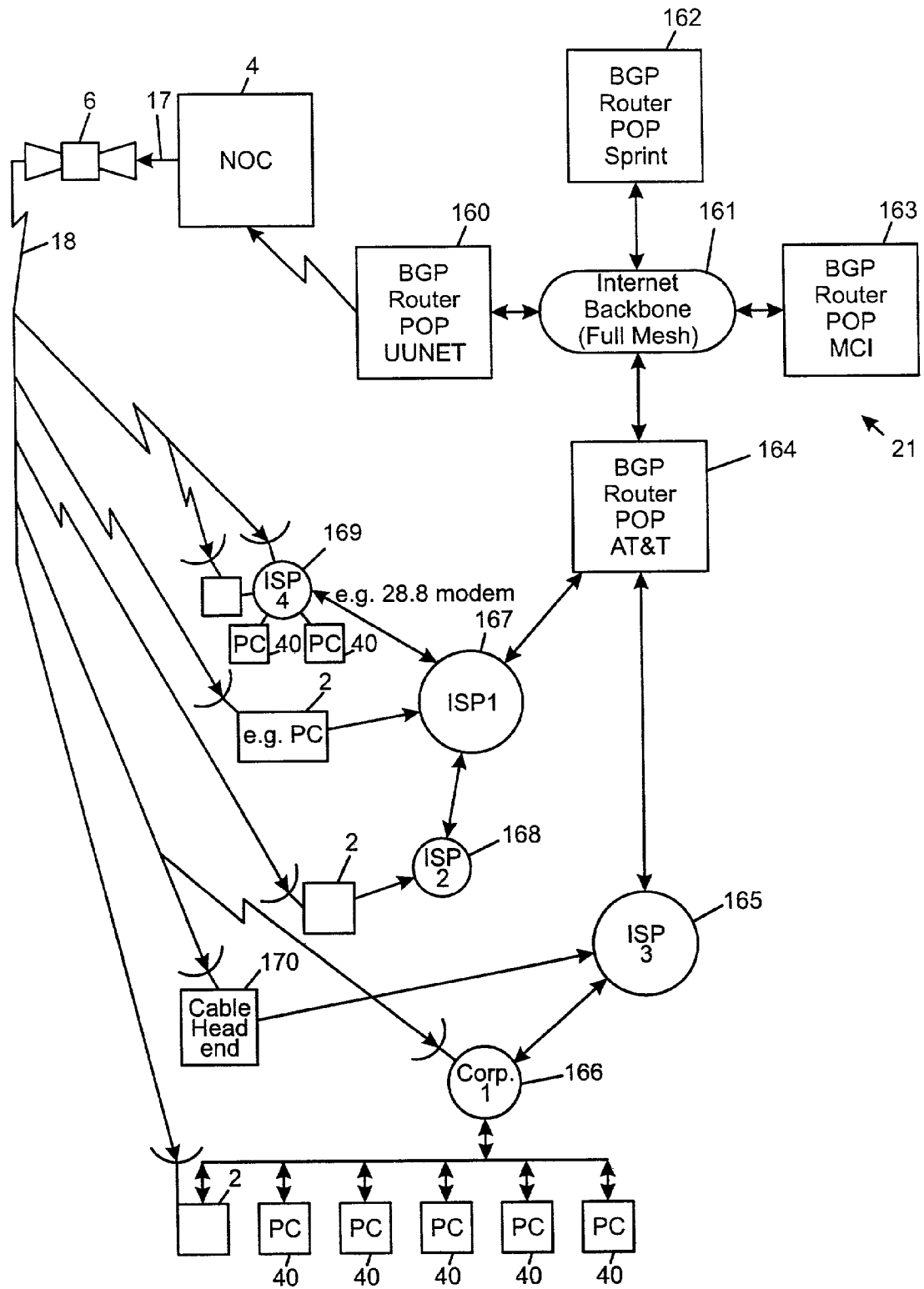

Referring specifically to FIG. 2, various generalized asymmetric satellite transmission architectures are shown. For example, the NOC 4 may provide asymmetric access to any ISP 169, cable headend 170, corporation 166 (e.g., a proxy server), and/or a terminal device 2.

The terminals connected to the ISP 169 and/or corporate server 166 need not be asymmetric satellite enabled terminal devices 2. In other words, the ISP and/or corporate server may be asymmetric satellite enabled while the individual terminals 40 need not be asymmetric satellite enabled. These terminals 40 may access the Internet through the ISP or corporate server in a conventional manner (e.g., using 28.8 or 56K dial-up modems).

Figure 2A:
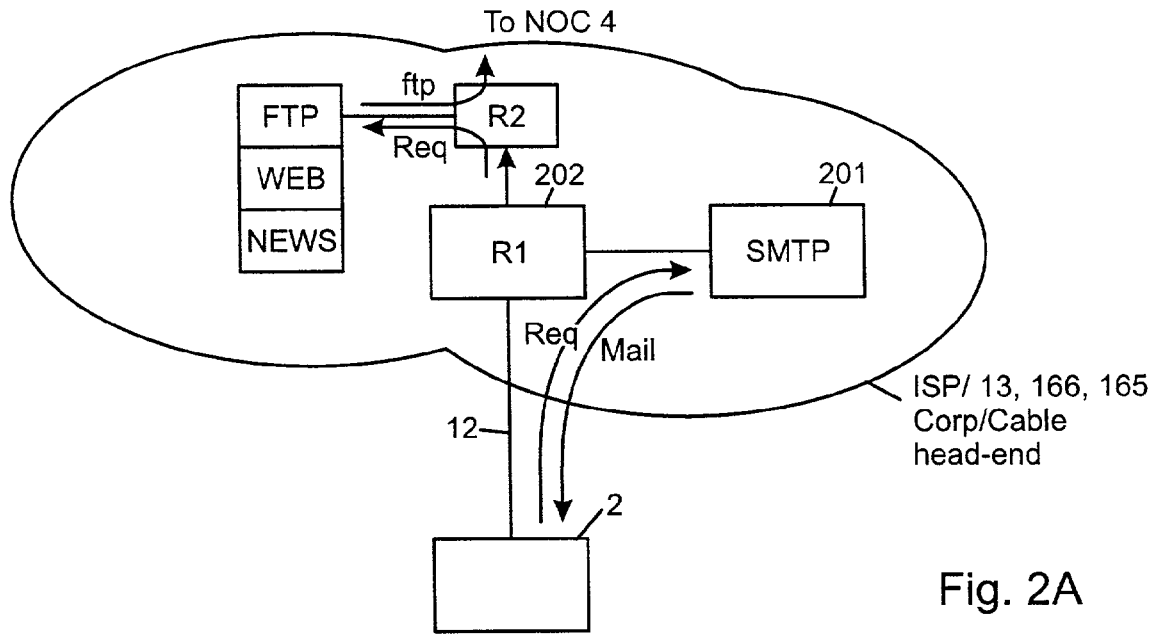
FIGS. 2a and 2b are block diagrams of different embodiments of architectures which may be utilized by Internet service providers (ISPs) to achieve intelligent routing based on whether a resource is coupled to a first or second hop of the network.
Figure 2B:
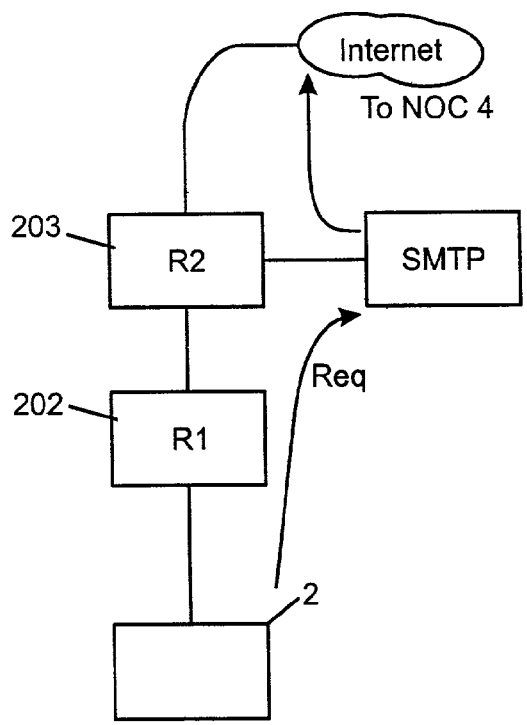

Within the architecture of FIGS. 1 and 2, services may be divided between the NOC 4 and the local cable headend 170, ISP 4, and/or corporate proxy server 166 to facilitate efficient operations. For example, as shown in FIGS. 2A–2B, by appropriately configuring one or more routers, it is possible to distribute functionality between the NOC 4 and the local server at, for example, the ISP. Referring specifically to FIG. 2A, where the mail server 201 is coupled to a first hop router 202 mail from the ISP may be returned directly back to the user over, for example, dial-up link 12. This result is achieved because router 202, being a first level router, knows that the IP address assigned to the terminal device has local significance. Because the IP address has local significance, the router 202 is able to return the mail request directly to the terminal device 2. Since mail requires a relatively low bandwidth, it is often more efficient to include a local mail server directly at the ISP. However, as shown in FIG. 2B, by configuring the mail server at the second level router where the IP address does not have local significance, it is possible to configure the local ISP, corporate proxy server, or cable headend such that all of the mail requests are returned via the NOC 4. Similarly, as shown in FIG. 2A, it may be desirable to configure FTP, WEB, and NEWs servers to be connected to one or more second level routers so that these requests are returned to the user via a high speed satellite (NOC) return path. Further, the user may even specify the address of the mail, FTP, WEB, NEWS, etc., servers to be those of the NOC 4.

As an alternate configuration, the local ISP may configure all mail requests to be returned to the asymmetric users via a satellite communication download. As discussed above with respect to FIGS. 2A, 2B, the transfer of E-mail to the user over the modem is accomplished by connecting the mail server to the first hop where the local address of the user is known. In this way, a request to the first hop router knows that the user is directly connected to it and sends the mail request back to the user across the 28.8/56K modem. Alternatively if the mail server is connected to a different router, e.g., a second-hop router within the ISP, the mail will be returned back to the user via his return address which, in the case of an asymmetric user, may belong to the network operations center 4. This routing occurs where the second level router does not know the user since the user is not directly connected to the second level router. The configuration where the mail is returned to the user via the 28.8/56K modem is shown in FIG. 2A where the ISP has the SMTP mail server connected directly to the router which then is connected directly to the user.

An alternate configuration is shown in FIG. 2B where the user is connected through a first router 202 to a second router 203 which may be configured to host the SMTP mail server. Requests coming in from the terminal 2 pass through the first router 202, through the second router 203, into the SMTP mail server, back out to the second router 203 and across the Internet 3 since the source address of the user is not known on the second router 203 and therefore is transmitted back across the Internet 3 to the NOC 4.

As shown in FIG. 2A, the same configuration feature discussed with regard to FIG. 2B may be utilized for an FTP server. By connecting the FTP server to the second level router within the ISP, user requests to the FTP server are input through router 1 and then through router 2. The FTP server then sends the response back out over the Internet 3, through the NOC 4 and then back through the satellite to the terminal 2. In addition to the FTP, the web and news server may also be coupled to a second level router or above, such as a third or fourth level router.

The second level router 203, may be considered an Internet router. By configuring the FTP server, web server, and/or news server to a second level or higher router, all requests to these servers may be routed over the Internet and back to the terminal 2 via the NOC 4 and satellite transmission link. Alternatively, where the FTP web and/or news server is connected to the RI router 202, then the user request may be returned to the user over the modem connection, e.g. 28.8/56K link. A further configuration is to have a duplicate news server, one on the first level router and one on the second level router. This configuration allows the ISP to serve two types of users: 1) a asymmetric connected user and 2) a user configured for conventional access. Additionally, this configuration allows the user to make alternate designations of an active news host so that the terminal device 2 can either receive downloads via the modem for news groups or downloads via the satellite link. In this manner, the user can select a high-speed access at which may be charged on a per bit basis or, for other matters, the user may select a slower access via the 28.8/56K modem for browsing at a slower speed. The choice of multiple connect options and multiple mail and/or other server options may appear as an option on the Internet browser select screen. For example, the Internet browser may automatically select a news server located at the second hop for binary picture files while selecting a news server located at the first hop for textual news groups. Alternatively, the user may configure the browser to select one of a plurality of predefined communication paths to deliver various services. When a user selects a news group, the user is prompted to select an appropriate connection cable, satellite, ISDN, PSTN, and may also be provided with the lowest cost rate for selecting the appropriate selection.

Figure 3:
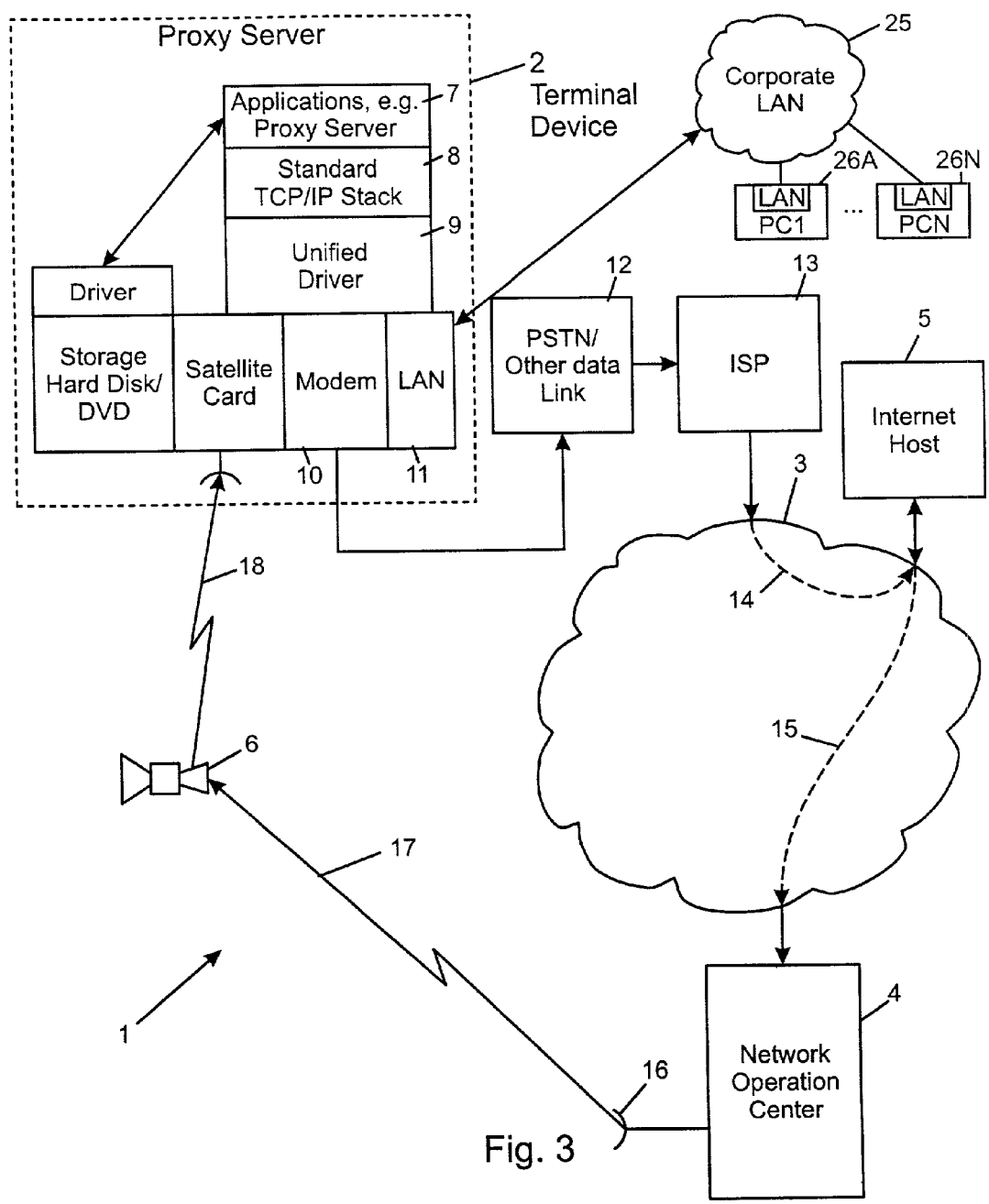
FIGS. 3–5 are block diagrams of different embodiments of the asymmetric satellite system in accordance with aspects of the present invention.
Figure 4:
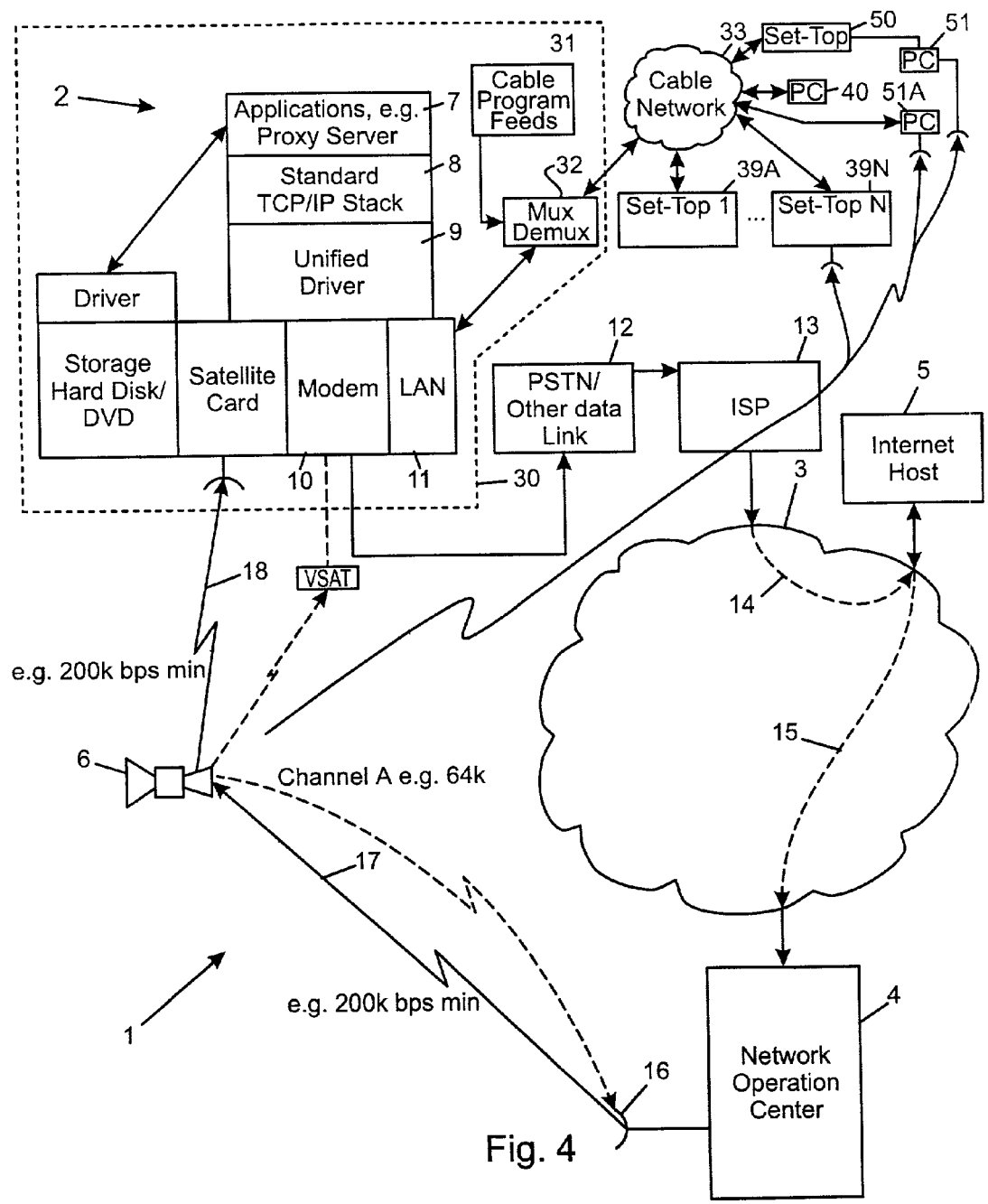

FIGS. 3–4 show two additional embodiments of the asymmetric access system 1. In FIG. 3, a corporate LAN 25 may be configured to include one or more symmetric terminal devices 26A coupled to a corporate LAN 25. The corporate LAN 25 may also include a terminal device 2 which may, for example, be configured as a proxy server providing Internet connectivity to the LAN 25. The terminal device 2 may be configured as an asymmetric satellite devices as described in the aforementioned embodiments. In this manner, Internet requests from any of the symmetric terminal devices 26A–26N may be routed to the terminal device 2 and thence over the Internet 3 to, for example, a remote Internet host 5. Responses to requests initiated by the terminal devices 26A . . . 26N may be returned through the NOC 4 and the satellite 6 back to the terminal device 2. Thereafter, the terminal device 2 routes the response to the appropriate terminal device 26A–26N across the corporate LAN 25.

FIG. 4 shows yet another configuration of the asymmetric satellite information system. In FIG. 4, a cable headend 30 may include one or more terminal devices 2 coupled to a cable network 33 via one or more devices such as multiplexer 32 and LAN 11. Multiplexer 32 may also accommodate a plurality of cable program feeds 31. The LAN 11 and multiplexer 32 may be alternatively configured such as by using a QAM scheme. The cable network 33 may be coupled to one or more settops 39A–39N, which may or may not include a satellite feed for directly receiving Internet data from the NOC 4. For example, in the illustrated embodiment, settop 39A receives Internet via the head-end 30 whereas settop 39N receives Internet via a local satellite dish 39N. Similarly, PC 40 may be directly coupled to the cable network 33 via an internal MPEG II decoder card. PC 40 may receive Internet access and/or cable feed via the MPEG II decoder card. PC 51A may also include a MPEG II decoder card which may be configured to use the same MPEG II decoder for both satellite based channels/information as well as cable network 33 based channels/information. The utilization of the same MPEG II decoder and/or tuner(s) for both cable and Internet based services on a single circuit card saves significant resources. Additionally, the combination of the two feed streams allows easy program coordination between the Internet feeds and Program/information feeds.

The upstream path from the cable head-end 30 may be via the data link 12 and/or through one or more direct dedicated lines to the NOC 4 such as by using a VSAT channel to directly connect to the NOC 4. In this manner, the cable head-end need only provide 28.8K, 56K or 64K of upstream bandwidth from the cable modems to the Internet 3 while still providing high speed downloads to customers via an asymmetric channel from the NOC 4.

Figure 5:
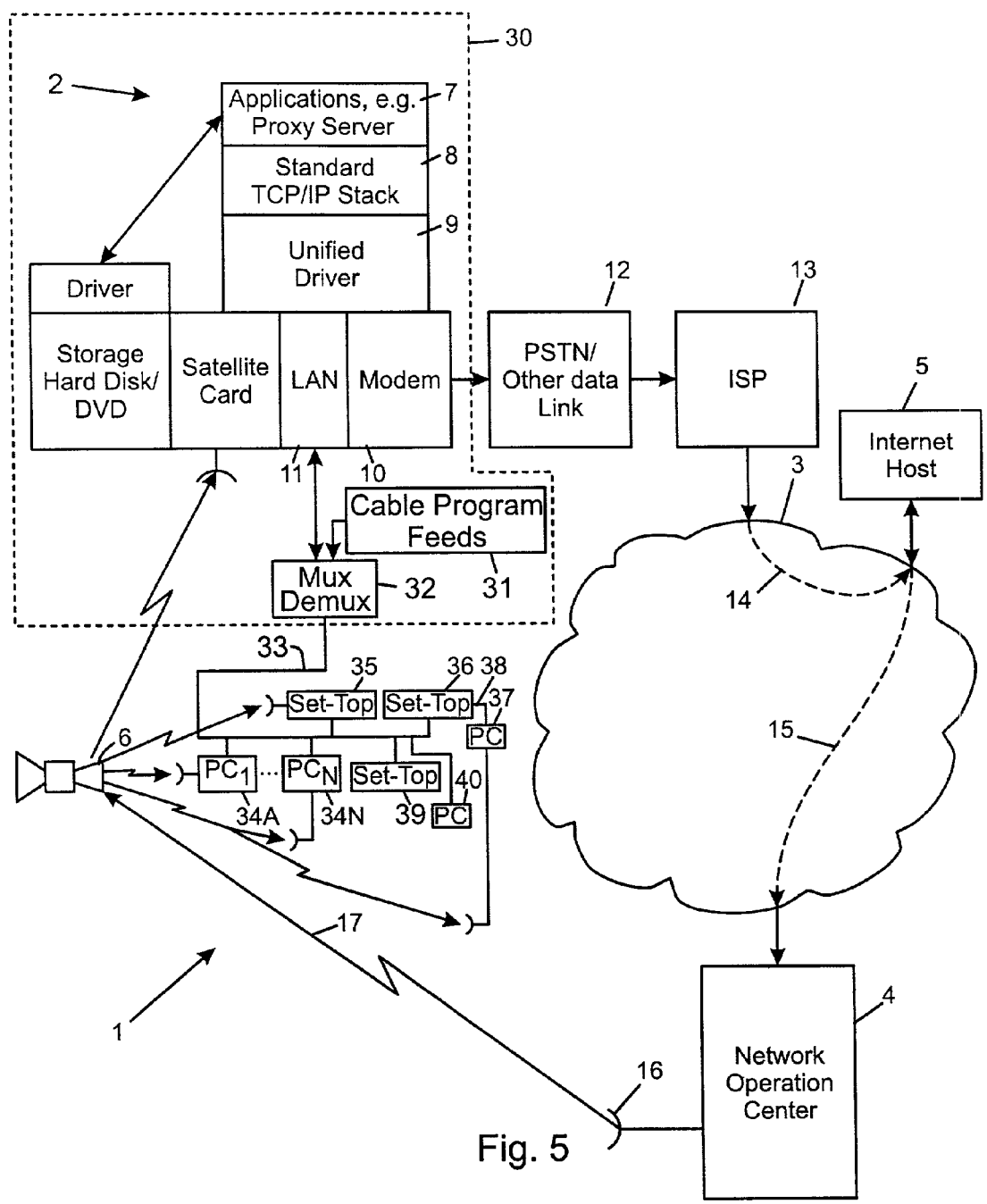

FIG. 5 shows a system similar to FIG. 4 with the exception that broadcasts are made directly to devices connected on the cable network.

Figure 6:
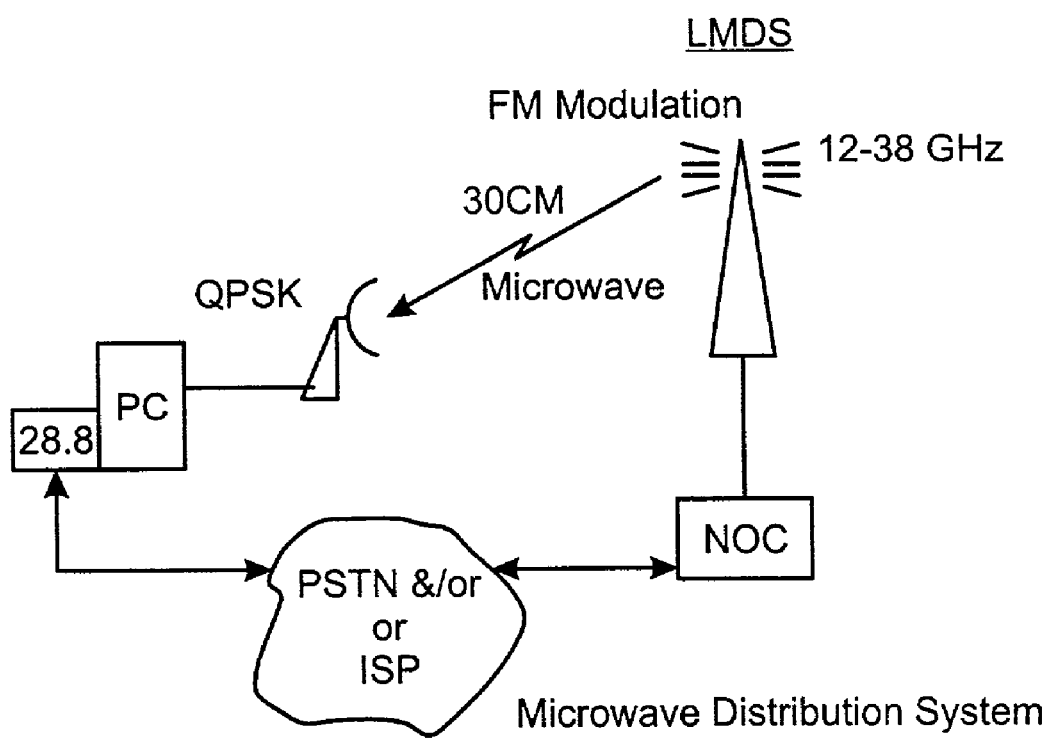
FIG. 6 shows an embodiment where a microwave transmission replaces the satellite transmission in embodiments of the present invention.

FIG. 6 shows that each of the aforementioned embodiments (as well as subsequent embodiments) may utilize microwave transmission systems instead of satellite transmissions. The return path may be via the Internet, or directly to the NOC 4 via the PSTN or other data network.

Figure 7:
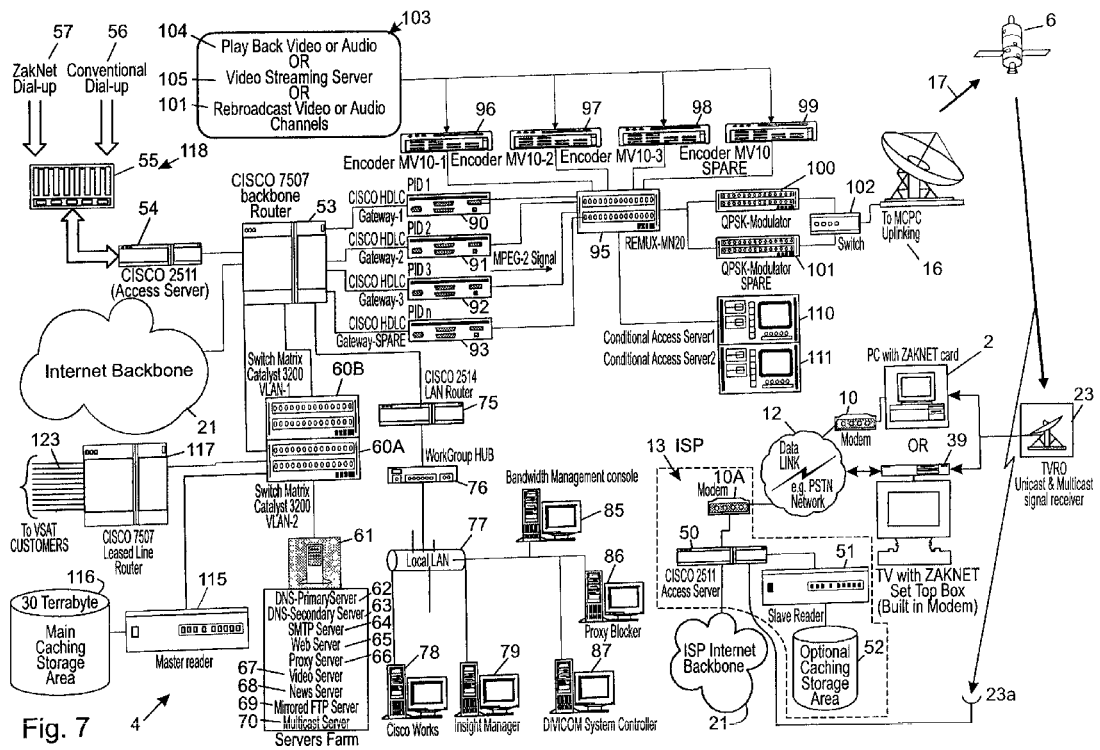
FIG. 7 is a block diagram of network operations center in accordance with embodiments of an asymmetric satellite system.

Referring to FIG. 7, a detailed description of the NOC 4 is provided. User requests may be transmitted across the public switch telephone network 12 through the ISP 13 across the Internet backbone 21 and into the NOC 4 at the backbone router 53. The backbone router 53 may interconnect a plurality of components such as an access server 54, a modem pool 55, a series of asymmetric dial up lines 57, and a series of conventional dial-up lines 56. Each of these components represents local Internet access 118 for subscribers local to the NOC and/or a leased line (e.g., a fiber, T1 or T3 line) for connecting businesses located near the NOC 4 (e.g., businesses in the same city). In this manner, the NOC 4 may provide local Internet access via conventional local Internet access dial up lines 56 or via high-speed asymmetric dial up lines 57. In this way the costs of the NOC 4 may be amortized to provide local ISP support at the location of the NOC with little or no additional expense. Thus, hardware at the NOC 4 may be utilized to provide access for remote users. Accordingly, it may be desirable to locate the NOC 4 near cities with populations in excess of 1 million people to achieve the maximum utilization of the NOC 4.

The switch matrix 60A and 60B may be coupled to the backbone router 53 and may be configured to provide connectivity to a plurality of different devices utilizing a high speed data access, for example, 100 megabit/Fast Ethernet connections and/or a fiber optic network (e.g., FDDI). For example, the switch matrix 60A, 60B, may be coupled to a leased line router 117 which, in turn, may be coupled to one or more fiber and/or satellite based leased line customers such as VSAT customers across link 123. Thus, the NOC 4 may also be utilized to service VSAT connected customers.

Additionally, other services may also be coupled to the backbone router 53 through the switch matrix 60A, 60B. These services may include a server farm which may have a plurality of servers interconnected using a high-speed data connection, e.g. 100 megabit per second Fast Ethernet and/or a FDDI connection.

The switch matrix 60A, 60B may be located at a central location in the design. Where the switch matrix 60A, 60B is located in a central location it may be desirable to configure the switch matrix in a fault tolerant manner. For example, each of the switch matrix 60A and 60B may be configured redundantly such that switch 60A may take over for switch 60B and such that each of the switches 60A and 60B has separate redundant power supplies and other backup power supply arrangements. The server farm may be configured to include a plurality of servers, each interconnected via high-speed data links such as 100 megabit per second Fast Ethernet and/or a FDDI connection. The servers may be variously configured to include a DNS primary server 62, a DNS secondary server 63, and SMTP server 64, a web server 65, a proxy server 66, a video server 67, a news server 68, a mirrored FTP server 69, and/or multicast server 70.

The DNS servers 62 and 63 may be configured as redundant domain named servers (DNS) the DNS servers 62, 63 may be configured to translate domain names such as "cnn.com" to a particular IP address, returning an IP address to the terminal device 2 in response to a particular domain name request. The domain name server is preferably located at the local ISP 13 for use with remote ZakSat subscribers. However, a domain name server 62, 63 may also be located in the NOC 4 for local ZakNet subscribers 56 and conventional dialup subscribers 57. Alternatively, each of the individual ISPs distributed throughout the coverage of the satellite may also utilize the DNS primary and secondary server 62, 63 in the NOC 4 in the event that DNS servers at the local ISP are faulty. Thus, the DNS servers 62, 63 in the NOC 4 may provide a back-up function for the local ISPs 13, mini-ISPs 168, corporate servers 166, and/or cable head-ends 170.

In addition to the above functions, the DNS primary and secondary server 62, 63 may also provide functionality to the other servers and devices in the network operations center in the following manner. Local users at the NOC 4 may use the domain name server 62, 63 across LAN 77 for local access. The domain name servers 62, 63 are not normally used by users of each of the individuals ISPs. Normally, in the asymmetric satellite system according to the invention, local terminal devices 2 transmit a request of "cnn.com" to the local DNS server at the ISP. The local DNS server, for example, DNS 1, performs a translation of the address "cnn.com" into an IP address and then issues the request to the translated IP address across the Internet. For local ISPs which lack sufficient resources, one and/or both DNS servers may be located at the NOC 4 with the translations being sent back to the local ISP so that the user request may be forwarded to the destination Internet host 5 such as "cnn.com".

Again referring to FIG. 7, the SMTP server 64 may be a conventional mail server. The SMTP server located at the NOC 4 may only be used for users connected directly to the NOC 4. Mail servers for remotely located Internet users may be located at the local ISP 13 such that mail requests at the local ISP 13 are conveyed back to the terminal device 2 via the public switch telephone network 12. In this way, mail requests which are normally of a small size and do not consume a large amount of bandwidth are easily transmitted back to terminal device 2 via the public switch telephone network. This allocation of the mail server is performed by entering the mail server address corresponding to the local ISP, in the appropriate Internet mail software. However, as discussed above with respect to FIG. 2B, mail requests may also be returned via the NOC 4.

Thus, the asymmetric satellite system may be configured to utilize the satellite path for certain sets of services such as FTP and HTTP access and to utilize the local modem return path for lower bandwidth requirement services such as SMTP mail.

A proxy server may be included in the ISP and function as either a firewall or to provide caching to the local subscriber. For example, the proxy server may provide censorship of the data coming from the Internet such as by screening inappropriate material as is well known for proxy server software.

In exemplary embodiments, the proxy server receives requests from any of the terminal devices 2 (e.g., devices coupled to local dial-up links 56, 57, leased lines, and/or remote terminal devices 2). Thereafter, the proxy server may initiate a request over the Internet and reply with a response back to the local server. The proxy server is configured such that all of the terminal devices 2 connected to the proxy server have significance to the proxy server. Thus, the proxy server knows where to return data collected from the Internet. The proxy server may also provide cache services for storing frequently accessed web pages for terminal device 2 and every other terminal connected to the ISP which also accesses a similar web page.

For some embodiments, proxy servers may require some additional setup and/or a script files in order to configure the Internet Bowsers appropriately.

Where the asymmetric satellite network is configured to operate using the proxy server for remote terminal devices 2, it may be desirable to configure the terminal devices 2 with an IP proxy address not of the proxy at a local ISP but of the proxy address of the proxy server in the NOC 4. In this manner, proxy requests made from the local terminal 2 are input into the ISP and out over the Internet 21 to the NOC 4 and then to the proxy server 66. The proxy server 66 can then initiate a request over the Internet to an Internet host 5, such as cnn.com. Thereafter, the request may be returned to the proxy server 66 and thereafter sent out over the satellite 6 back to the individual terminal 2.

The proxy server can be configurable within the NOC such that a plurality of proxy servers are provided and the load distributed among the proxy servers. This may be done by configuring each of the individual terminals with a different proxy address or by including a load balancing server coupling a plurality of the proxy servers. The load balancing server may be variously configured and may include a CISCO load director. The proxy servers may also be configured to conform to censorship requirements in each individual country such that proxy server A only provides material that would be suitable for viewing in Iran, whereas proxy server B provides material that would suitable for viewing in Saudi Arabia, or Singapore.

In yet another alternate configuration, terminal device 2 may serve as a proxy server to accommodate a plurality of different users. The different users may be directly connected to the terminal device 2 via a plurality of modems (e.g., a modem bank) and/or connected to the terminal device 2 via a LAN 25 having a number of connected personal computers or other computing platforms 26A such as a network computer. In this manner, the terminal device 2 may serve as a mini-ISP.

Figure 8:
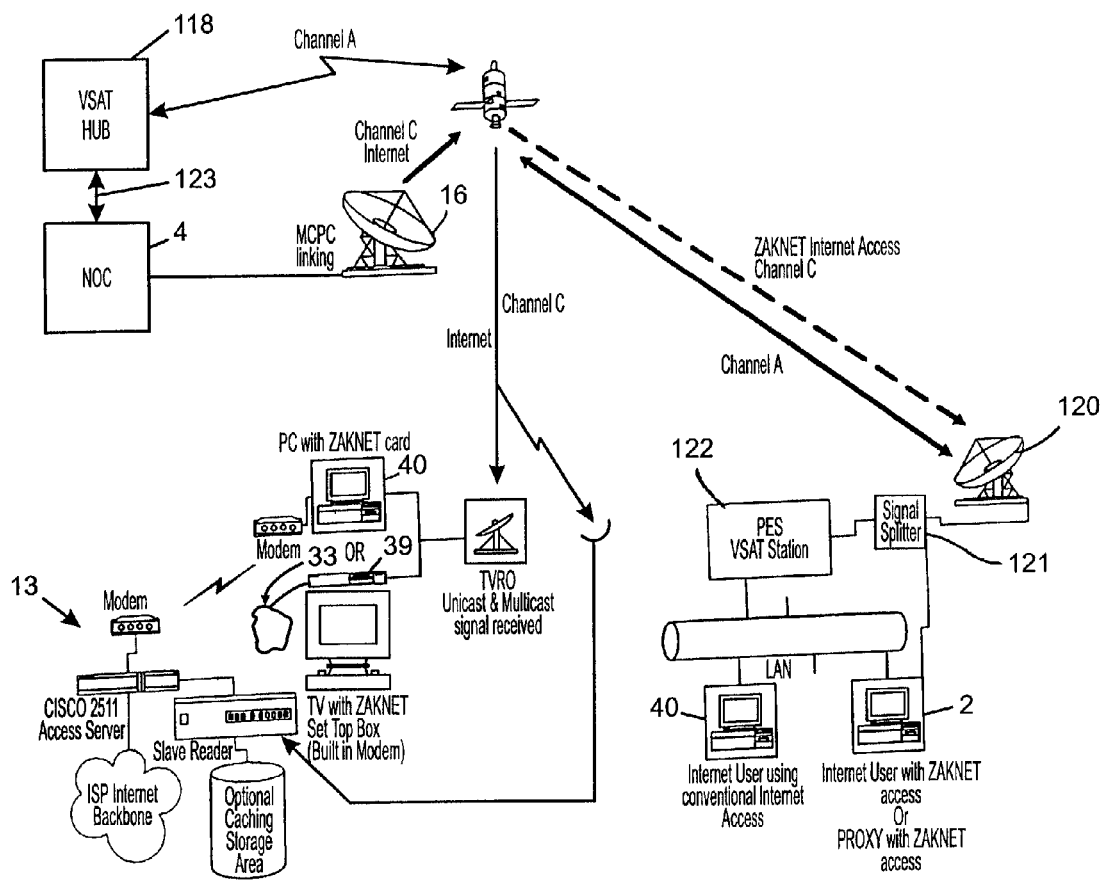
FIGS. 8–9 are block diagrams of various VSAT configurations which may be utilized in the asymmetric satellite system in accordance with aspects of the invention.
Figure 9:
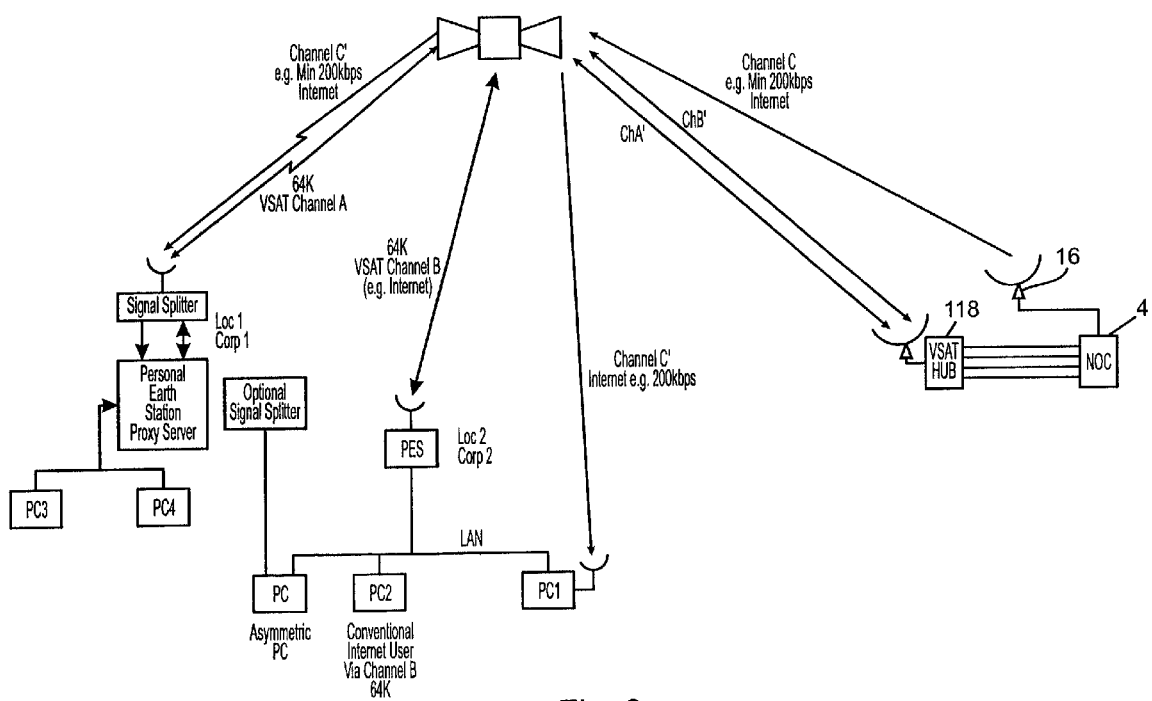

FIGS. 8–9 show various VSAT solutions which allow the use of the same and/or different satellite antenna facilities to be utilized for both Internet and normal VSAT communications. Referring specifically to FIG. 8, where the NOC 4 (e.g., as shown in FIG. 7) is coupled to a VSAT hub 118, the VSAT network (e.g., channel A) may be utilized as the return path to the NOC 4. In this manner a remote connected ISP, cable head-end, and/or corporate Internet server 122 need not have any connection to the Internet 21. The "back channel" for the asymmetric access may be via a VSAT connection with the forward channel provided using standard asymmetric transfer techniques as described herein. Thus, it is possible to locate ISPs in very remote regions such as in India and China without regard to the reliability of leased lines and/or even the telephone system. For example, it is possible to install the Internet server 122 in a corporation, cable head-end, and/or ISP in a remote region. Where connection to the Internet server 122 is via cable and/or a LAN, there is no need to utilize the local telephone network. Additionally, the same satellite dish may be utilized for both VSAT and asymmetric satellite services, reducing the cost of the VSAT connection. One example of a system utilizing the services of this embodiment would be an apartment building or corporation located in a remote area or in an area with unreliable telephone service. The upstream channel is provided by channel A which may be a slow speed 64 Kbps channel. This channel may be dedicated to one VSAT terminal or distributed among a plurality of VSAT terminals using a TDMA and/or packet based distribution scheme. In any event, the upstream channel may be relatively slow speed and have a relatively low cost. However, the downstream link (e.g., channel C) may be shared among many terminal devices 2 and may include many services such as Internet and/or multicast multimedia events such as pay-per-view movies and/or television programming. The cost of the downstream channel is shared among many users such as ISP's 13 (with or without asymmetric users) and/or cable networks 33. Thus, a highly autonomous system has been established.

Referring specifically to FIG. 9, the concept of a personal earth station disposed at a plurality of remote locations such as corporations and/or apartment buildings is shown. The personal earth stations may be configured as proxy servers, cable head-ends, and/or as conventional ISPs. It may be desirable to co-locate the VSAT hub with the NOC 4. Where the VSAT hub 118 is co-located with the NOC 4, many remote VSAT connected installations will only require a single hop to reach the NOC 4 thus reducing the latency time associated with an Internet access request. Further, co-location allows for easy TDMA and/or packet based access systems to be utilized minimizing VSAT transponder costs.

Figure 10:
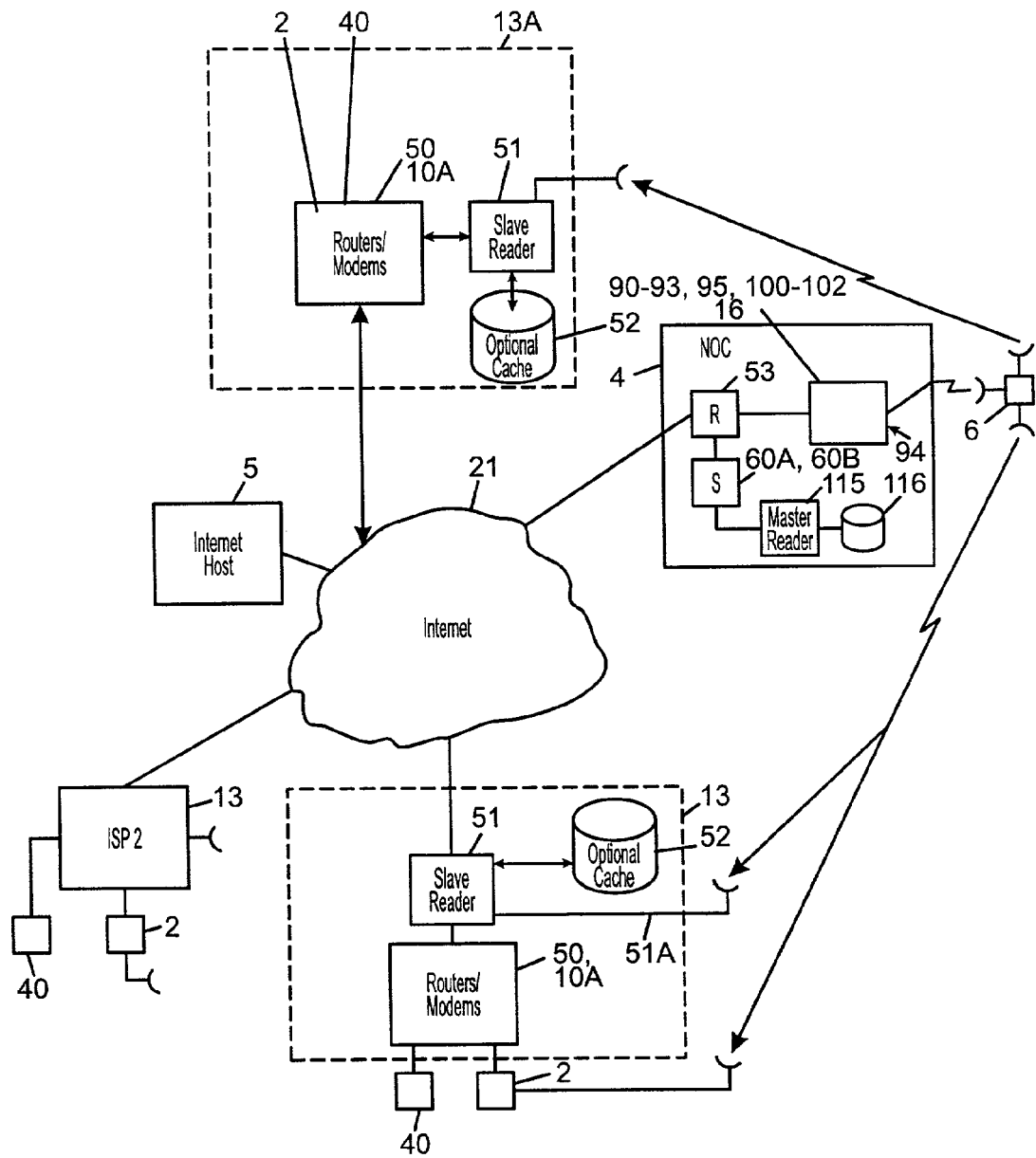
FIG. 10 is a block diagram showing caching operations to improve Internet access performance which may be utilized with content access control and multicasting distribution.

In any of the aforementioned embodiments, caching circuitry may be added to improve performance. For example, Referring to FIGS. 7 and 10, the caching circuitry in the ISP and/or the NOC 4 may function as described below. A user from, for example, terminal 2 issues a request to ISP 13 via any suitable mechanism such as a public switch telephone network into modems and through one or more routers 50. A determination is made whether the request is being made from a asymmetric access user or via a conventional Internet user. The determination between a conventional Internet user and a asymmetric Internet user is based on a policy-based routing scheme which may look at factors such as the source address of the IP packet. If the source address of the IP packet is from an asymmetric user, the request may be examined to determine if the requested information is in the master cache facility 116. If the requested information is in the master cache facility 116, then the slave reader 51 may forward the request to the NOC 4. The NOC 4 may then pass the request through the master reader 115 into the main master cache 116, back out through the master switch matrix 60A, 60B, the router 53, across various gating circuitry to satellite 6. The request may thereafter be forwarded to the satellite receiver of terminal device 2. The request may also be forwarded to optional cache 52 of the ISP 13. If the request from terminal 2 is determined by slave reader 51 not to be in the master cache, then the slave reader 51 may initiate a request across the Internet 21 to Internet host 5 with the return IP address directing the packet back to the NOC 4 (including optional caching in the master cache) which thereafter forwards the packet via satellite 6 back to terminal 2, and/or ISP 13 including optional cache 52.

Alternatively where a normal Internet user 40 is connected to the ISP 13, slave reader 51 determines if the request for the normal Internet user is in optional cache 52. If the request is in optional cache 52, the request is immediately downloaded to the normal Internet user 40.

Another option is to bypass requests for conventional users directly to the Internet and have the reply returned via land lines or high speed asymmetric satellite lines (depending on whether a NOC IP address is used or an IP address of the ISP is used).

If the request is not in optional cache 52, the slave reader can determine whether the request is in master cache 116. If the requested information is in master cache 116, the slave reader may initiate a request through router 53, switch matrix 60A, 60B, to master reader 115 to supply the information from master cache 116 back through the NOC 4 out to satellite 6 and back to receiver 51A of the slave reader 51. The data may thereafter be cached in optional cache 52 and/or supplied directly to the symmetric Internet user 40. Note that in this system, the local cache is optional and need not be included. Where the requested information is not in the local cache or the master cache, the request may be bypassed to the Internet and returned back to the user via the ISP. This option may be best utilized where the ISP is a mini-isp (such as ISP2 in FIG. 2 or Corp 1 166 in FIG. 2) and/or where the ISP is configured as a proxy server, with each of the users being configured to utilize the proxy server.

Alternatively, where the local cache 52 is included, the local cache may be updated via downloads from the master cache 116. The NOC 4 may use unused bandwidth on the satellite to periodically update the local caches 52 for a plurality of Internet service providers as certain popular pages change such as weather pages or newspaper pages. Thus, a single multicast transmission may update all of the cache facilities simultaneously. In other embodiments, the entire master cache facility may be replicated at the ISP optional cache.

The caching concepts described herein may be utilized to eliminate the bottleneck at each of the points of presence on the Internet and create a virtual Internet in the main caching facility 116 consisting of many terra bytes. In this manner, a complete mirror image of the Internet may be created at the NOC such that all of the popular pages may be downloaded immediately, thus vastly reducing the amount of traffic on the Internet and reducing the costs of the ISP to maintain a large pipeline connection to the Internet. Large databases may also be contracted to provide content to the main caching facilities and create mirror sites on the NOC master cache 116 such that database requests may also be served directly from the NOC 4. Such popular sites as Tucows and/or IBM patent server may be mirrored by mirroring the databases and associated software.

Additional details of the cache facility are provided below.

Figure 7A:
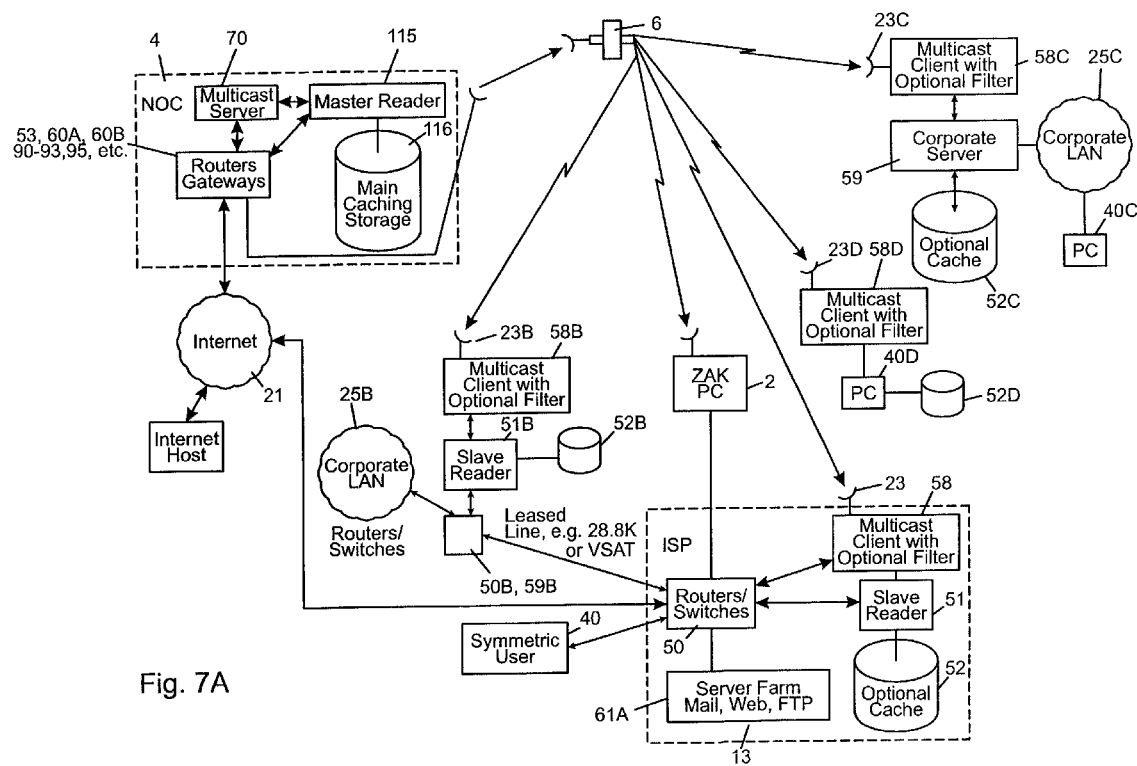
FIG. 7A is a block diagram of a caching system in accordance embodiments of the asymmetric satellite system.

FIG. 7A provides a simplified version of FIG. 7 with particular emphasis on the caching circuitry. In particular, the ISP 13 may include the slave reader 51, optional cache 52, router/switches 50, and a multicast client 58 with an optional filter facility 58B, and a satellite receive antenna 23. Coupled to the ISP 13 may be a plurality of symmetric Internet users 40, a plurality of asymmetric Internet users 2, and/or a plurality of corporate symmetric or asymmetric Internet users including routers/switches 50B, a corporate LAN 25B, slave reader 51B, optional cache 52B, a multicast client with optional filter 58B, and/or a receive antenna 23B. The ISP 13 may be coupled to the NOC 4 via the Internet 21 or other suitable mechanism discussed above. As shown in FIG. 7A, a simplified diagram of the NOC 4 may include a plurality of routers/gateways, such as Cisco backbone (core) router 53, switch matrix 60A, 60B, gateways 92, 93, remultiplexer 95 and various output devices such as modulators, switches, and other devices. A multicast server 70 may be coupled to the various router/gateways and/or to the master reader 115 and associated master cache storage 116.

The output of the NOC 4 may be distributed via satellite 6 to the various receivers 23, 23B, and 23C. A plurality of non-Internet connected devices such as PC 40D with multicast client/optional filter 58D and local cache facility 52D may also receive satellite transmission 6. For example, a corporate user may be connected via satellite receiver 23C, multicast client/optional filter 58C, corporate server 59, optional cache 52C, corporate LAN 25C, and/or PC 40C. The stand alone PC 40D and/or corporate user 59 may receive multicast transmissions and download only selected data via multicast client with optional filter 58D. In this way, the stand alone PC 40D and/or corporate server 59 may collect certain information in accordance with the filter and supply that information thereafter to one or more users connected to PC 40D and/or corporate server 59.

Various features of the system shown in FIG. 7A may be described as follows. The slave reader 51 and/or 51B a complete index of all pages and/or data stored in master cache 116 and/or associated slave caches 52, 52B. The cache index or table stored in slave reader 51, 51B may contain a complete index of the contents of the master cache 116 and/or local optional cache 52, 52B. A determination may be made whether to download data from the master cache facility in the NOC 4 or whether to supply the data locally via the optional cache 52, 52B. The asymmetric users may or may not utilize the services of the optional cache 52, 52B. Where the requested data is large, the services of the master cache in the NOC 4 may be utilized so that the return transmission may occur via high speed satellite link through satellite 6 back to the asymmetric users. Alternatively, the asymmetric users may be supplied with information from the local cache facility over the satellite link dependent upon the size of the information requested.

For example, the ISP router/switches 50 may include a policy-based routing protocol client which determines the size of the packets requested in the optional cache 52 and determines what the optimum return path to the asymmetric and/or corporate user would be (i.e., either satellite or via direct terrestrial download from optional cache 52). For example, if a small packet were requested containing a page with a relatively small amount of data, the packet may be downloaded to the corporate user and/or asymmetric user directly from optional cache 52 via the terrestrial link. However, if the policy based routing algorithm determines that the size of the data is over a particular threshold value, the corporate user 50B, 59B and/or asymmetric user 2 may be provided the data by routing the response through the NOC 4 so that the data may be returned via satellite 6. Additionally, the policy based routing mechanism may be preinformed with the link to either the asymmetric terminal 2 and/or the corporate LAN such that the policy based routing mechanism is different depending on the speed of the line to the corporate user and/or the asymmetric terminal 2. For example, if the asymmetric user utilizes a 14.4 Kbps modem connection, then most likely the return path for any substantive size packets would be via the satellite link across satellite 6. However, if the connection to the asymmetric user were a multichannel ISDN connection at 128K bps, then the policy based routing mechanism would route a larger percentage of the packets up to a higher threshold back via the multichannel ISDN line. Where the corporate users 50B, 59 are coupled via a high speed link, a greater percentage of packets are downloaded via a non-satellite (terrestrial) link and a higher data capacity threshold may be used for the requested information in the policy based routing scheme.

The cache tables are preferably updated after each cache update, or on predefined periods. The cache/index update may be downloaded from the NOC 4 via the satellite link 6 and/or via the Internet connection 21. The updates to the index and cache table may comprise the entire table and/or an update of a particular portion of the table. Since the updates are only concerning the index entries and not the actual data, the amount of bandwidth associated with the updates is small. Further, periodically the local index and the master index are compared and synchronized using any suitable method such as a check sum for other comparison technique. Data in the master cache desired by the local cache facility may be downloaded via the satellite 6. Further, the local cache may have data from non-asymmetric users stored in its local cache. Thus, this data may also be utilized for asymmetric users. Similarly, the data stored in the cache for symmetric users may be utilized for asymmetric users.

The initialization of each of the optional caches 52, 52B, 52C, 52D may occur via satellite link 6 and/or over the Internet 21. Alternatively, the optional cache storage may be synchronized at the NOC 4 such that the complete contents of the master cache are copied to the optional cache prior to distribution of the optional cache to the ISP. In this manner, the optional cache is preloaded with the data at the NOC and shipped to each of the ISPs to provide an initialization process and save the initial bandwidth of transferring many terra bytes of data to the individual ISP providers. Thereafter, the optional caches may be updated periodically via the satellite link 6 and/or Internet 21. Alternatively, the optional cache storage units 52–52D may be updated and/or initialized on an as-needed basis such that the caches are increasingly utilized as more requests are received and cached.

Figure 7B:
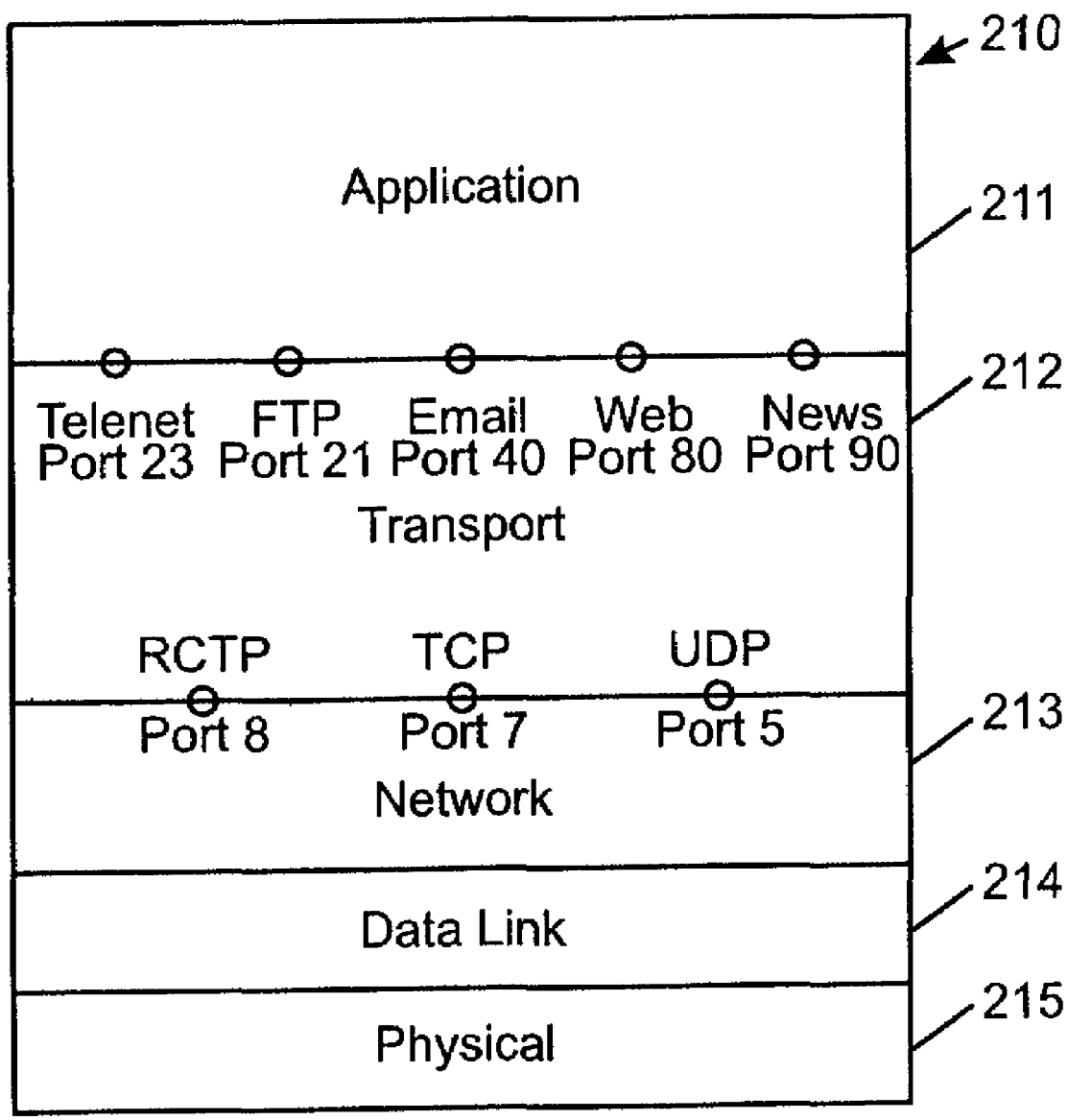
FIG. 7B is a functional block of a TCP/IP client/server model.

FIG. 7B shows an exemplary TCP/IP protocol stack 210 of a client/server. The protocol stack is formed layers: the application layer 211, the transport layer 212, the network layer 213, the data link layer 214, and the physical layer 215. Communication between the various layers takes place in accordance with various protocols. For example, the communications between the network layer 213 and the transport layer 212 occurs across port 17, the UDP interface and port 6 of the TCP interface. Further, communication between the transport layer 212 and the application layer 211 may occur using any number of predefined interfaces. For example, telnet data may use port 23, FTP data may use port 21, SMTP data (e.g., mail) may use port 25, and Usenet News data may use port 144. The use of a defined interface within the TCP/IP stack 210 allows various components in the network (such as routers/switches 50) to determine the type of data request being processed. In this manner, special processing can occur depending on the type of data request.

Figure 7C:
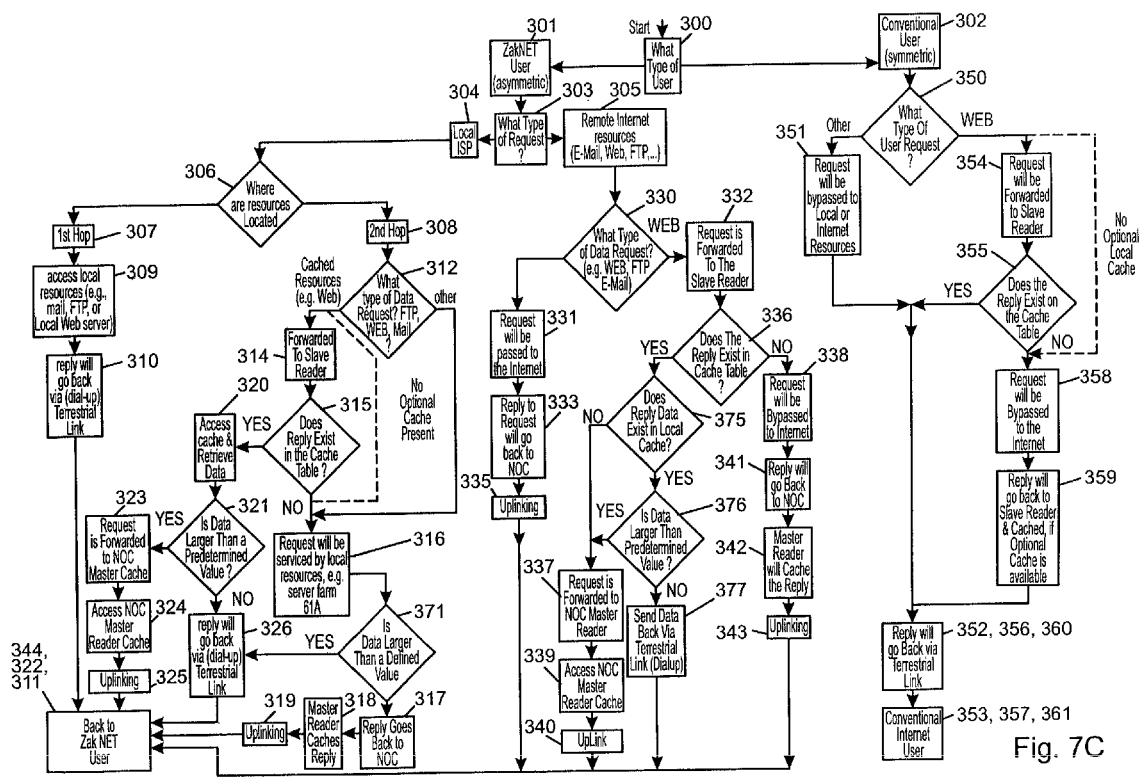
FIG. 7C is a flow diagram of a cache system in accordance with embodiments of the asymmetric satellite system.

Referring to FIG. 7C, an exemplary flow diagram is provided which provides a first exemplary architecture for implementing the system shown in FIG. 7A. In step 300, a decision is made as to the type of user making the request. The user may be either a conventional symmetric Internet user or a asymmetric Internet user. The determination as to whether the user is a symmetric or asymmetric Internet user may be made by any suitable mechanism such as by the assigned IP address of the user or by the phone lines/leased lines upon which the user accesses the ISP. If the user is a conventional symmetric Internet user, processing proceeds to step 302. If the user is an asymmetric Internet user, processing proceeds to step 301.

Once a determination is made that the user is a asymmetric Internet user, processing proceeds at step 303. In step 303, a determination is made as to the type of user request. Many ISP's implement virtual hosting where the ISP hosts their own web sights, commercial web sights, customer's web sites, and locally provided content. All of these sites are local sites which use the local ISP's or companies local resources. The determination is made via the destination address requested by the user. If the user is requesting access to content provided locally by the ISP or corporate server, then processing continues on step 304. Where the content is provided at other locations on the Internet, processing proceeds to step 305.

Where the requested resources reside locally (step 304), a determination is made as to whether the resources reside at a $1^{st}$ hop router/switch or at a second hop router/switch. Where the resources reside at a $1^{st}$ hop router, processing proceeds to step 307 and the resources are accessed in step 309. The resources at the first level router may be variously configured to include mail services, news services, local web resources, and/or local ftp resources. Where the resources are located on a first level router, the reply (step 310) is typically sent back directly to the requesting user via a terrestrial link (step 311). Since the resources are on the first level router, the user will have local significance, even where the user is assigned an IP address corresponding to the NOC 4.

Alternatively, where the resources (e.g., mail services, news services, local web resources, and/or local ftp resources) are located on a second level router (step 308), a determination may be made as to the type of data resources being requested (step 312). For example, conventions of the protocol stack 210 (FIG. 7B) may be utilized to determine whether the request is E-mail, Web, FTP, Telenet, News, or another type of request. The ISP may be configured to dispose the resources locally (at either the first or second level router) or the resources may be disposed elsewhere on the Internet. Where the resources being requested are of the type that may be stored in a cache, then processing proceeds to step 314 where the request may be forwarded to the slave reader (e.g., 51, 51b). The slave reader may access a cache table or other index to determine whether the value requested (e.g., a web page) exists in either the local or master cache (step 315). If the requested data is disposed in the cache, the cache request may be either forwarded directly to the NOC 4 (step 323) or processed locally based on a policy based routing scheme. If a policy based routing scheme is utilized, a check is made to determine the size of the requested page (step 320). If the size of the requested page is smaller than a predetermined defined value (step 321), then the requested page is returned via the terrestrial link (step 326).

The predetermined defined value varies with the speed of the terrestrial link. For example, where the terrestrial link is a 14.4 Kbps modem, the predetermined defined value will be set at a low level such that most of the returned data will be via the satellite link. However, where the terrestrial link is a 64 Kbps ISDN link, more of the return data will be via the terrestrial link. The policy based routing scheme balances the longer delay associated with outputting the request over the Internet to the master cache in the NOC 4 and the associated high speed satellite download time, with the generally low delay, lower speed terrestrial line to determine the fastest path. Additionally, the policy based routing scheme may utilize a different path depending on the number of concurrent sessions utilizing one path or the other.

Where the policy based routing scheme determines that the fastest path is the terrestrial link, the data may be pushed back to the first level routers/switches and then back to the user over the terrestrial link (step 322). Alternatively, where the policy based routing scheme determines that the fastest path is the satellite link, the request may be forwarded to the NOC (step 323) for processing by the master cache (step 324). Thereafter, the data may be transmitted (step 325) back to the user via the satellite link.

Of course, it is not required that a policy based routing scheme be utilized. For example, itis possible to out all requests for particular types of data (e.g., mail, web, or news data) directly to the NOC 4 and/or via the terrestrial link. For example, mail may always be returned via a terrestrial link and web data always via a satellite link.

Referring again to step 315, where a determination is made that the requested data does not exist in a cache table, the request may be bypassed to the local resources, e.g., a local server farm 61A (step 316). The data from the local server farm may be either forwarded directly to the NOC 4 (step 318) or sent back via the terrestrial link based on a policy based routing scheme. If a policy based routing scheme is utilized, a check is made to determine the size of the requested data (step 371). If the size of the requested page is smaller than a predetermined defined value (step 371), then the requested page is returned via the terrestrial link (step 372). Alternatively, if the size of the data is larger than a predetermined defined value, the reply from the local resources (e.g., server farm 61A) will be sent back to the NOC (step 317) since the return IP address is that of the NOC 4. Where the data is cacheable data such as Web pages, the data may be cached in the master cache (step 318) and sent back to the asymmetric user (step 326). Storing the local data in the master cache at the NOC allows only a request to be sent to the NOC 4 for future satellite return accesses to the same data. Simultaneously, the data may also be multicast to all ISP's and/or corporate users to update a plurality of local optional caches.

Again referring to step 312, where the data request is not for cachable data, the request may be serviced by accessing local resources (step 316), and the processing continues as described above with step 371. Again, a policy based routing scheme may be implemented where the policy based routing scheme determines whether the fastest path is the terrestrial link or the satellite link based on the current traffic patterns, the associated delays, the bandwidth of the various links, and the amount of data. Where the policy based routing scheme determines that the fastest path is the terrestrial link, the data may be pushed back to the first level routers/switches and then back to the user over the terrestrial link (not shown). Alternatively, where the policy based routing scheme determines that the fastest path is the satellite link the data may be forwarded to the NOC (step 317) for processing over the satellite link and back to the asymmetric user.

Again referring to step 303, where the resources are located at a remote location across the Internet (step 305), a determination is made as to the type of data being requested (step 330). Where the data requested is cacheable, the data request is forwarded to the slave reader 51, 51B (step 332). Where the requested data is not cacheable, the request is bypassed to the Internet resources (step 331). Since the return address on the request may be the NOC 4 for asymmetric users, the reply is output back to the asymmetric user via the NOC 4 (steps 331, 333, 335).

Where the data being requested from a remote internet site is cacheable, the request is forwarded to the slave reader (step 332). The slave reader may access a cache table or other index to determine whether the value requested (e.g., a web page) exists in either the local or master cache (step 332). If the requested data is disposed in the either the local or master cache, processing proceeds at step 375. In step 375, a determination is made whether the data is located in the optional local cache. If there is no local cache, or if the data is not in the local cache, processing continues at step 337. Where the data is in the local cache and the master cache, a policy based routing scheme may optionally be utilized to determine how the request is processed. If a policy based routing scheme is utilized, a check is made (step 376) to determine the size of the requested data. As described above, if the size of the requested data is smaller than a predetermined defined value, then the requested page is returned via the terrestrial link (step 377). If the size of the requested data is larger than the predetermined defined value, processing proceeds to step 337 where the request is forwarded to the master reader of the NOC 4. The data is thereafter retrieved from the master cache (step 339) and sent via the satellite (step 340) back to the asymmetric user (step 344).

Referring again to step 336, where a determination is made that the requested data does not exist in a cache table, the request may be bypassed to the Internet (step 338) with the reply being sent back to the NOC (step 341) since the return IP address may be that of the NOC 4. Where the data is cacheable data such as Web pages, the data may be cached in the master cache and/or sent back to the asymmetric user (step 342–343), with optional caching in the local cache. Storing the data in the master cache at the NOC 4 allows only a request to be sent to the NOC for future accesses to the same data Simultaneously, the data may also be multicast to all ISP's and/or corporate users to update a plurality of local optional caches.

Again referring to step 300, conventional Internet users (step 302) may also be served by the same cache resources that are used for asymmetric Internet users. For example, where the data requested by the user is not cachable, the requests will be processed by the local resources and/or output to the Internet resources for servicing (step 351). Responses from either the Internet resources or local data are returned to the user via the terrestrial link (steps 352–353).

Where the resources requested by the user are cacheable, the requests may be forwarded to the slave reader (step 354). The slave reader determines whether the requested information is in the local optional cache. If the requested data are stored in the local optional cache, the data may be output to the conventional user via the terrestrial link (steps 356–357). Where the resources are not stored in the local cache, the requests may be output to the Internet (step 358) with the return address of the conventional Internet user via, for example, the ISP. The reply data may be sent back to the ISP or corporate account, and optionally stored in the optional slave cache (step 359) and output to the conventional user along terrestrial links (361).

As a further option, the asymmetric satellite system need not include a local cache at the ISP or corporate site. Where the optional cache is not included, it may still be desirable to include the slave reader which maintains the table of the contents of the master cache which is replicated via either the Internet and/or a satellite download from the NOC. The replica of the master cache stored at the slave reader allows the slave reader to determine the contents of the master cache and to make a determination of whether to forward the requested page, packet or data request to the Internet host or to the NOC 4 for processing. Where the data is resident in the master cache, the slave reader may forward the request to the NOC 4 for processing by the master reader and master cache. The use of a slave reader at the ISP, as opposed to the incorporation of an entire cache facility, can provide significant cost savings while still maintaining the same through-put and centralizing all of the cache facilities at the NOC 4 for speedy download to each of the sites. In this manner, only a small request packet need be sent from the ISP or corporate site to the NOC 4 and the amount of data going across the Internet is reduced considerably. Accordingly, the cache configuration in accordance with the embodiments of the present invention has significant advantages over conventional cache designs.

Figure 7D:
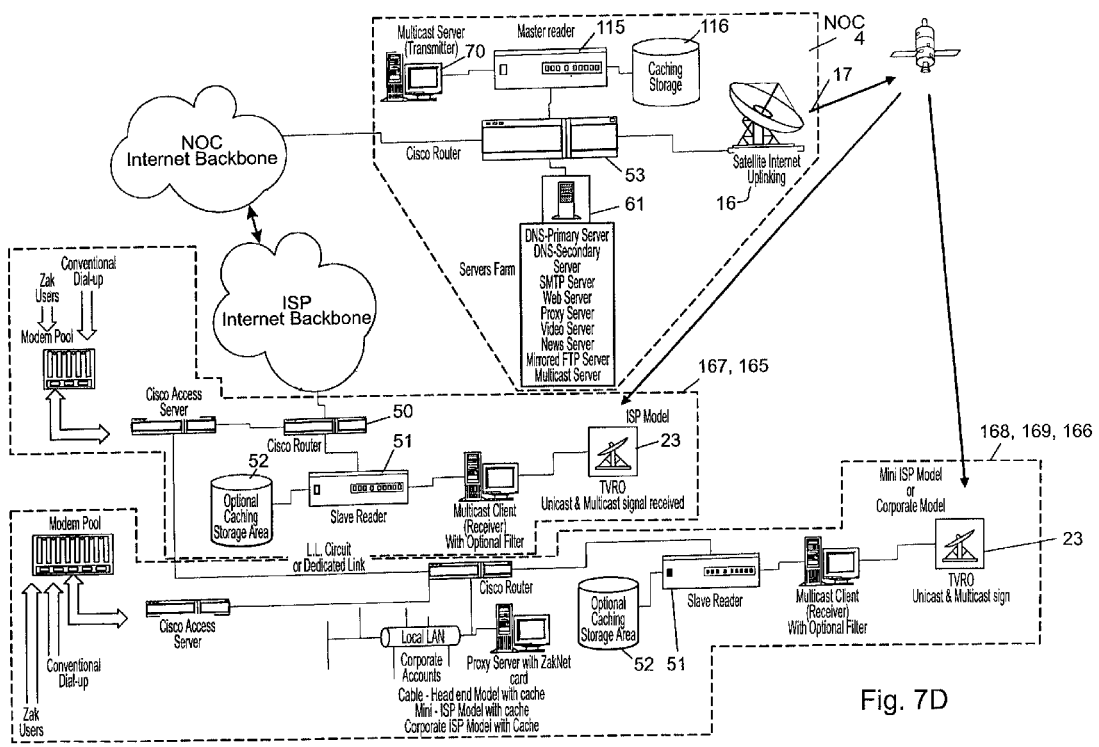
FIG. 7D shows a cache system architecture which may be utilized to implement the configurations shown in FIG. 2.

Referring to FIG. 7D, a block diagram is shown concerning how the various configurations shown in FIG. 2 are implemented using the caching designs as discussed above. For example, the mini-ISP model 168, 169 and/or the corporate model 166 may be implemented as shown in FIG. 7D, in accordance with the discussion above.

Filtering

An optional configuration for the present system is the inclusion of a multicast client with optional filter 58, 58B, 58C, and 58D in FIG. 7A. The multicast filter may be variously configured depending on the particular application. Conventional multicast systems predefine which contents will be broadcasted and the time of each of these broadcasts. In conventional multicast systems, the user is provided with an announcement or schedule of upcoming broadcasts and is not preinformed as to the contents of those broadcasts. The user is only provided with information that the broadcast is for his particular station. By contrast, the present multicast filter is a highly sophisticated client which provides selective screening of multicast data, such as multicast web pages, from the NOC to each of the individual ISPs and/or corporate users. For example, the multicast filter may be utilized in countries which do not permit certain types of content in the same manner that proxy server software is utilized currently. Accordingly, the ISP or corporate user may filter pages and/or data which has been requested by a user and returned via the NOC 4 at the ISP incoming site. In this manner, a selective screening of data may be accomplished by the ISP and/or corporate site using the multicast filter. Additionally, the multicast filter may be utilized to cache selective contents being multicast from the NOC 4 into the local cache of the ISP and/or corporate user. Each of the individual ISPs may also selectively store content based on the site from which the content originates and/or based on the contents itself. For example, the multicast filter may read data and web pages as they are being broadcast from the NOC 4 and received in each of the ISPs and/or corporate users and/or terminal devices 2. The multicast filter may screen for certain types of web pages and/or other content so that a selective cache of specific search enabled content is stored locally.

The present multicast filter may be completely different from conventional surf-watch or other type programs which simply block the contents of incoming pages based on particular key words or addresses. In contrast, the present system is designed to scan multicast transmissions which are accompanied by multicast IP addresses. The multicast transmissions have multicast addresses which are associated with a particular multicast group. Users at the receive site, such as ISPs and/or corporate users, are assigned to a plurality of multicast groups. The filter is preferably enabled on the receiver end of the multicasting client. The multicast receive filter allows blocking of incoming data based on source address, domain name, and contents of the particular pages. Additionally, the filter may also block particular news groups which are objectionable in certain countries, such as binary picture file news groups. Further, an individual user may alternatively program a filter to select particular web pages and/or data that the user is interested in from the multicast transmission of the NOC and cache this data for later viewing. The multicast transmission of cached updates to each of the slave caches is a significant advantage over conventional cache systems.

The multicasting to each of the individual ISPs allows each of the individual ISPs to have a much slower connection to the Internet backbone. In this manner, each of the ISPs may have a very low speed connection to the Internet backbone and yet be updated at a very high rate via the NOC for both conventional or non-conventional asymmetric users. Accordingly, the ISP may save significant costs in its connection to the Internet for both symmetric and asymmetric users and still utilize the same cache for both users. With respect to the slave readers, the slave readers even without caches may be distributed across the entire Internet and synchronized with the master cache. In this manner, the distributed hierarchical architecture allows each of the ISPs (e.g., mini-ISPs) to have a low speed Internet connection and still service their users at a very high speed. Accordingly, an ISP may have an extremely low start-up cost and yet service a large number of conventional symmetric Internet users via the use of an asymmetric satellite download directly to the ISP. In this manner, the Internet service provider may have a very low speed connection to the Internet, e.g., a 56 kb/s modem connection, and yet respond to requests at a very high speed via an asymmetric satellite connection. Accordingly, the total cost for an Internet service provider start-up may be only a few thousand dollars. Additionally, kits may be sold which allow an Internet service provider to start up with virtually no cost other than a server, a few phone lines, an asymmetric satellite receiver, and a single phone and/or VSAT connection to the Internet.

Multicast.

Multicast is a broadcast from one location to a plurality of locations (one to many). Multicast over the Internet may occur using one or more of the following protocols: IGMP protocol (i.e., Internet Group Management Protocol), IP multicasting protocol, XTP (express transfer protocol), MTP (multicast transport protocol), and/or ST-11 protocol. The multicast server 70 (FIG. 7A) may be present in the NOC 4. Starburst Communication Corporation has an existing client application which may be executed on terminal 2 and allow for multicast services to be provided over the Internet or via the NOC 4 to each of the individual terminal devices 2. Additional multicast clients may be provided by Lucent corporation. The multicast clients may be modified to operate in the asymmetric system as described below.

The client application runs on terminal device 2. The multicast server may be disposed in the network operations center 4. Internet class D IP addresses are reserved for multicasting. Accordingly, conventionally only Internet service providers or terminal devices having a class D IP address may receive multicast transmissions.

The multicast server 70 operates using a connectionless protocol such as user datagram protocol. In this manner, the multicast server may send out announcements concerning the contents of upcoming multicast broadcasts. The announcements may also include a predetermined class of users so that only a certain subset of the users may receive the multicast program. Alternatively, the multicast program may be directed to all users. For some classes of multicast service, each of the users at the individual terminals 2 must register with the multicast server in order to be enabled to receive the multicast transmission.

In other classes of multicast service, the users at the individual terminals 2 and, for example, stand-alone terminal devices not connected to the Internet do not require registration. For terminal devices with no back channel to the NOC 4, the integrity of the data download is ensured by repeating the transmission of the data a number of times such that the statistical probability of the earth station without a back channel receiving all of the data packets correctly is very high. Alternatively, any suitable error correcting protocols may be utilized. For some types of data, such as video data, some embodiments may utilize no error correction scheme. Alternatively, were a back channel exists and the UDP protocol is utilized, each of the individual PCS at the end of the transmission may request retransmission of one or more particular ones of the data packets.

Conventionally, the multicast server has not been utilized over satellites, and in particular, over asymmetric satellite systems. The concepts in accordance with one or more aspects of the present invention is to incorporate the multicast server directly in the NOC 4 and connect each of the individual terminal devices 2 to the multicast server via the Internet and a specialized application running on each of the individual terminal devices 2.

Accordingly, data from the multicast server may be switched through switch matrix 60A, 60B through backbone router 53, and through one or more gateways 90. Each gateway may deliver, for example, 12 megabits per second or more of data. In exemplary embodiments, the NOC 4 may be configured to include three or more gateways which may be suitable for 36 megabits per second or more of data. Additional gateways may be added and/or existing gateways upgraded. Further, additional space segment may be purchased as the system increases, providing a modular and flexible system to expand as the user base increases.

The gateways 90 may, for example, be utilized to encapsulate the multicast data (e.g., data from a Starburst multicast server data or other conventional multicast server) into MPEG-2 encapsulated data which may thereafter be transferred through multiplexer 95, modulated on QPSK modulator 100, and output through switch 102 and uplink 16. The uplink 16 may either be multicarrier per channel MCPC or single carrier per channel SCPC. Additional improvements in the multicast server system (e.g., a Starburst or Lucent server) include the provision for a plurality of multicast sessions running on a single multicast server.

For example, referring to FIG. 11, a multicast server farm 600 may include a plurality of multicast sessions (e.g., multicast 1 through multicast 5 601–605) hosted on either a single server 606 or on a plurality of servers 606–607. Each of the multicast sessions may have individual control modules 610–614 for controlling each of the individual multicast sessions and may also include one or more global control modules 615. The global control modules 615 may be variously configured to control the interaction between the different multicast sessions 601–605 and allocation of the different multicast sessions between different multicast servers 606–607. For example, the global control modules 615 may include a bandwidth control module 616 and an announcement control module 617. The announcement control 616 may define the type of multicast data being broadcast by a particular multicast session and the bandwidth control 616 may allocate the different mulitcast sessions among the different multicast servers and/or determine/track the bandwidth which may be utilized by each of the multicast sessions and/or multicast servers.

Although the multicast server farm 600 may be controlled in a central location at, for example, the NOC 4, it may also be desirable to have distributed control. For example, particularly with regard to the individual control modules 610–614, it may be desirable to control these modules utilizing one or more remote terminals 40A using, for example, remote terminal access software 609. In this manner, each of the individual multicast server applications (e.g., multicast session 1–4) running at the NOC 4 may be controlled locally from a remote entity (e.g., a corporation, hotel, apartment complex, community, campus, or school car dealership, franchise) having a terminal device 40A. The remote entity may locate the terminal device 40A at any suitable location within the remote entity such as the corporation's head office, front desk, and/or network control center or other telecommunication centers for the remote entity. In this manner, a remote entity can utilize the asymmetric nature of the current satellite transmission infrastructure to update databases throughout a remote entity's network at each of the local terminal devices 2. Each of the remote control devices 40A need not necessarily receive the multicast broadcast and therefore does not necessarily have to be an asymmetric device. However, it may be desirable for the remote control devices 40A to monitor the broadcast being broadcast by the multicast server to verify data integrity.

Conventionally, the multicast server 606, 607 was controlled via a terminal adjacent to the physical multicast server. For example, the global control module 615 may be implemented in one or more control terminals located in the NOC 4. However, as the multicast server configuration is integrated into the NOC 4, it is less desirable to have a different company representative and/or operators control each multicast server. Accordingly, a specialized control application (e.g., individual control modules 610–614) running in each server demon (e.g., multicast session 1–5) may be incorporated into the multicast servers which allows remote control operation for that particular server demon to be accomplished remotely. The remote control may, for example, occur via a back channel through the Internet using full duplex communication between the multicast server application demons 610–614 and a remote terminal 40A which may be located in each of the individual remote entities.

In this manner, the NOC resources may be further expanded to provide sophisticated database coordination between a plurality of sites of an remote entity. Thus, the resources of the NOC 4 may also be utilized by the remote entity to synchronize one or more databases amongst a plurality of remote sites using the above described multicast data distribution system. Additionally, an individual apartment complex, hotel, and/or community may configure the multicast server to output content based on the viewing preferences of each of the respective target audiences, and remotely controlled at the hotel or apartment via the remote terminal 40A.

In addition to the above, a single company may request the resources of two or more servers located at one or more NOC 4. In this case, a distributed file system may be enabled between the plurality of servers such that the first server and the second server have a coordinated file system and the control program running in the first server and/or the second server may also be controlled via a remote terminal 40A. Thus, the file system for a particular multicast application may be distributed across a plurality of servers in a single NOC 4 and/or a plurality of servers distributed across a plurality of NOCs 4 (e.g., 600A, 600B).

Using, for example, global control module 615, each multicast server may be allocated a particular portion of the overall bandwidth allocated to the server farm 600. The control for the allocation of the resources, as well as the allocation of the bandwidth, may be controlled remotely and/or locally at the NOC 4 using, for example, a higher level privilege controlled by global control module 615. Where a higher level privilege is utilized at the NOC 4, the control distributed to each of the remote terminals 40A, may be limited in that it may only control the individual multicast sessions 601–605 within certain set parameters. Where the global control module 615 has a higher level of authority, the global control module may set certain ranges which may be requested by each of the multicast sessions. For example, as shown in FIG. 12, each remote control terminal 40A may be assigned certain rights, resources, and remote asymmetric users within its domain. Thus, the particular remote terminal 40A may be given rights to certain content stored in the server farm 600, access to the Internet, ability to upload and/or download content to a individual file storage area, ability to control multicast bandwidth within certain ranges, as well as other rights and/or resources. Supervisory control for managing each of the multicast sessions may remain in the global control module 615 in order to define certain parameters under which each of the remote control applications may operate. Thus, the global control module 615 may prevent the remote control applications 609 from interfering with the other multicast demons running on the multicast server farm 612.

As an additional example, each multicast session/user 601–605 may be assigned certain access rights to be controlled via remote administration and/or within the multicast server farm 600 in the NOC 4. The number of remote administrators supported by each of the multicast servers 606, 607 may be in excess of 100. To ensure high integrity between customers, (multicast closed user groups), a secure operating system may be utilized in each multicast server 606–607. For example, as shown in FIG. 13, each customer may be given separate file storage area, multicast addresses, and maximum transmission speeds defined by an administrator at the NOC. The remote administrator may have the ability to upload and delete files within a private storage area in the server farm 600 at the NOC. This may be accomplished, for example, using a remote graphical user interface.

In exemplary embodiments, under control of the global control module 615, each remote administrator (e.g., using remote control terminal 40A) may only be given access to a particular multicast group, particular announce and transfer addresses commands, transmission speeds, priorities, etc. Each of these parameters may be individually and/or globally defined for each remote administrator using, for example, the global control module 615 in the NOC 4. Each remote administrator may also be assigned a priority scheme for a particular transmission bandwidth (e.g., transponder) based on a priority scheme of allocating the bandwidth among a plurality of applications including different multicast sessions and asymmetric Internet users. In exemplary embodiments, where the remote administrator tags a particular multicast transmission with a higher priority request, the data is distributed with less latency than a multicast transmission tagged with a lower priority request. However, higher priority requests may be more expensive than lower priority requests. This may be important where the transmission resources are shared and not dedicated. Remote administrators are preferably only defined by the global control module 615 at the NOC 4. Individual asymmetric users may be defined by either the global control module 615 and/or by the remote control terminals 40A.

Again referring to the multicast server farm 600 in the NOC 4, the multicast server may, in fact, be a plurality of multicast servers, each interconnected and serving a single user's database functions. Accordingly, the remote control application running in terminal 40A may be configured to control each of the plurality of multicast servers and/or a plurality of multicast sessions running on one or more multicast servers. The improved multicast service system of the present invention includes, for example, in a first aspect, using a single server to provide a plurality of multicast server resources each isolated from the other. For example, within a single server, a first multicast server may have a first set of users, a first set of resources, e.g., a portion of a partitioned hard disk (FIG. 13) and a first set of rights (FIG. 12). A second multicast server may have a second set of resources, a second set of users, a second set of rights, and a second portion of the partitioned hard disk as one of its resources. Similarly, a third and fourth multicast server application may be running on a single trusted multicast server. Each one of the multicast server applications may be considered to be a separate server demon and may be assigned to different remote entities, e.g., different companies. In this way, a plurality of remote entities may share a single multicast server.

In exemplary embodiments, a video server 67 may include a plurality of movies stored in a compressed movie format, such as MPEG2. The video server 67 can push the encoded movies directly out over the satellite 6 via the gateways 90–93, the multiplexer 95 with the QPSK modulator 100, the switch 102 and the uplink 16. In alternate embodiments, the movies may be stored in a centralized database and output to each multicast server session upon request. Thus, a multicast server session may have access to both private data and centralized data. The multicast data may be broadcast to the terminal devices 2, settops 39, and/or mini-ISPs or cable head-ends. These movies and/or other programs shows and the like are broadcast on a continuous basis and may be downloaded to the PC and/or stored on the local hard disk device for later viewing by the user. The movies and/or other content may be provided by one or more of the multicast servers. In this manner, the server farm 600, 70 may be provided on a single large cached server and controlled as an individual session. Further, the main cache 116 and the server farm 70 may be integrated into a single resource with each of the individual sessions operated above as individual sessions with globally and/or remotely controlled resources. For example, a large server could incorporate all of the functions of the main cache and server farms 70, 600 using either a distributed file system and/or global control module 615 discussed above.

Where movies are distributed via the NOC 4, it may be desirable to tag the movies with one or more identifiers such as a PID number which specially identifies the movie. Additionally, the broadcast times of the movies and description of the movies may be broadcast periodically by the video server and/or multicast server. It may be desirable to store the broadcast times and movie descriptions on the local hard disks in each of the terminal devices 2. In this manner, the user may scan through various programs and/or transmissions which may occur in the future and selectively record various programs and/or other data for later viewing or storage in a video or audio library. In this manner, as movies and other programs are selected by one client (e.g., mini-ISP), these same movies and programs may be made available to all other clients. Thus, the bandwidth is maximized while each of the clients may be billed using a billing system discussed below.

At each of the terminal devices 2, various applications may be employed to utilize the asymmetric capabilities of the present invention. For example, one application which may be configured to run in either a settop box and/or the PC is Omnibox, available from Omnibox corporation. The Omnibox functionality includes storage of audio and/or video and/or other data products, devices or applications. It also allows for banking functions and communication with any other connection on the system such as an output to a videotape recorder or other storage device.

A plurality of video, audio and/or data inputs such as playback video or audio from, for example, tape recorders and/or video tape recorders, video and/or audio from a video streaming server, and/or rebroadcast video and/or audio transmissions which are detected over the satellite air links, and/or microwave links, may be rebroadcast on the asymmetric satellite facilities from the NOC 4. The video, audio and/or other data broadcast from the NOC 4 may be encoded via MPEG encoders 96–99 and output through multiplex 95 QPSK modulator 100, switch 102 and uplink 16 to a plurality of terminal devices and/or settop devices 39. In this manner, the same facility which is utilized to transmit the Internet services can also be utilized to transmit video and audio programming services in the same manner as direct broadcast television. Thus, the cost of the NOC can be spread over a number of service delivery platforms, thus, the cost of providing an individual service is minimized.

Where a settop box 39 is utilized, it may be desirable to utilize either a network computer and/or another PCI based settop box such as one available from Intercom PC. Currently, some settop box manufacturers are including a PCI expansion slot in the settop box and enabling the settop box to run conventional browser applications. Additionally, some settop box manufactures are incorporating expensive cable modems into the settop boxes. However, cable modems are disadvantageous in that the consume precious bandwidth over the cable resources and require two-way cable communications. This may require the entire cable system to be reconfigured. As user's are looking to cable companies to provide Internet resources, it is desirable to include cable modem-like features in all new settops. However, this may be impractical for many cable network configurations.

Accordingly, one aspect of the present invention proposes the integration of the asymmetric satellite access card into the settop box 39. In this manner, the settop box may receive Internet programming as well as many additional channels or other services. The asymmetric satellite access card may be simply plugged into the PCI bus in the back of existing settop boxes. These boxes may provide Internet access services via a Web Browser on the television (e.g., Web TV) and/or provide an external port capable of supplying high speed Internet access to one or more connected PCS. Where a plurality of PCS and/or WEB TVS are connected to a single settop box, it may be desirable to configure the settop box to operate as a proxy server so that only a single asymmetric IP address need be assigned to the settop. The settop box may have an existing application containing a program guide for all of the services provided over the cable network, including those services provided by both the asymmetric satellite card and the cable network. The asymmetric satellite services may be accessed using the settop box which is suitably configured for web applications and/or an attached PC. Where the settop box is configured for web applications, it may be desirable to utilize a settop box having a wireless keyboard and mouse.

Cisco Works 78 is a management application for each of the routers and provides control for the routing functions in the NOC 4. The Cisco Works console also gathers statistics for utilization of the NOC 4. This is a conventional application available from Cisco Corporation which may be utilized in the NOC 4 to provide management functions.

The Insite Manager is a management application for the Compaq server. The Insite Manager application may be utilized to control a plurality of Compaq servers located throughout the NOC 4 and may be configured to provide various error management functions, error logging functions, error statistic functions, alarm systems, diagnostic functions, and/or other network monitoring functions. A DIVICOM system controller 87 may be configured to provide control of a plurality of controllers within the NOC 4. For example, the DIVICOM system controller may provide both control and monitoring of various devices such as the encoder 96–99, the gateways 90–93, the multiplexer 95, QPSK modulators 100–101, and/or the switch 102. The Cisco Works console controls the leased line router 117 and the switch matrix 60A, 60B, as well as the backbone routers 53, access server 54.

Proxy Blocker

A proxy blocker 86 disposed in the NOC 4 (see FIG. 7) may be variously configured. The proxy blocker 86 may be configured as an application which operates on one or more control computers in the NOC 4. The proxy blocker 86 may be configured to monitor requests originating via the Internet backbone 21 and to determine, using one or more statistical measures, whether a particular asymmetric terminal 2 is being used as a proxy server. For example, where the number of active connections associated with a single source IP address exceeds a predetermined threshold a warning or corrective measure may be taken. In one exemplary embodiment, if four or more active connections are associated with a single IP address, a warning message may be generated at the NOC 4. Where the number of active connections associated with a single IP address exceeds 6 or more active connections, corrective action may be taken. The statistical measures indicative of a proxy situation need not necessarily be limited to the number of active connections. For example, statistical measures may also include other factors such as the number of packets originating from the source address and/or other activity originating from the source address indicative of a proxy server serving a plurality of clients.

Corrective action may include such actions as blocking the data flow to the offending IP address, instructing the ISP to disconnect the offending IP address, constraining the bandwidth allocated to the offending IP address, and/or sending a warning to the user at the offending IP address. For example, in one embodiment, when the proxy server detects that a plurality of non-authorized clients are coupled to one or more terminal devices 2, the proxy blocker may react by restricting the bandwidth allocated to the IP address and/or shutting down connections to the suspected proxy terminal device 2. In exemplary embodiments, the proxy blocker 87 may inform the suspected proxy terminal device 2 of the suspected problem. The notification may also be sent to the Internet provider, corporate information manger, and/or other contact person via the Internet and/or other appropriate means. In some embodiments, an automatic message may be generated instructing the contact person to investigate the suspected proxy situation and either rectify the situation or provide details to administrators in the NOC 4 as to why the proxy situation has continued to exist. If the situation is a legitimate situation, it is possible to either configure the proxy blocker to identify the individual IP address as a legitimate proxy server and/or to individually adjust the statistics for a particular IP address in order to minimize any future false indications of a proxy situation. For legitimate proxy configurations, it is desirable to maintain a database of all proxy servers (e.g., by storing an associated IP address). The database may then be checked so that authorized proxy IP addresses may be excluded from further checks.

Another situation which can be problematic for the NOC is spoofing where an incorrect return address is used to flood the NOC 4 with erroneous IP addresses. However, the only entity which can disturb the operation of the NOC 4 is an ISP connected directly to the backbone which distributes spoofed IP addresses. However, if such a condition did occur, it would be easy to trace. Additionally, the backbone router 53 provides a mechanism to automatically filter out any IP addresses which do not belong to the NOC 4. Accordingly, where the ISP providers limit the IP return address to one of the authorized set of IP addresses for an associated authorized user, the asymmetric system in accordance with aspects of the present invention cannot be spoofed.

Parental Control Filtering

In an alternate embodiment of the present invention, the same filtering concepts discussed above may be utilized to provide parental control, as for example, a child friendly mini-ISP. In one exemplary embodiment, a mini-ISP may wish to advertise and provide services which are child friendly. In these mini-ISPs, a obscenity control filter could be activated at the mini-ISP with a data source received from the master cache concerning obscenity control parameters such as offensive IP addresses and/or news groups. This data base can be updated on a frequent basis at the NOC such as on a daily basis. In this manner, the mini ISPs or corporate accounts are provided with a very useful and up-to-date filtering service as a service of the NOC. The mini-ISP can either turn this feature on or off at will in its configuration set-up parameters. Thus, the slave reader in the mini-ISP and/or other facility may be utilized to provide child friendly and/or obscenity free services to selected user groups. Further, in some embodiments, upon initiation of the IP session, a user may be provided with the ability to turn on or off filtering. In this manner, a parent may have full access while a child in the same home would have restricted access. In the embodiments where a filter is enabled in the mini-ISP and/or corporate account, it may be desirable to configure the mini-ISP and/or corporate server as a proxy server. Existing applications for proxy servers allow requests to be filtered from certain IP addresses and/or news groups. However, these applications must be supplied and installed on a weekly basis by the individual sites. By contrast, the present configuration allows for more frequent updates and no maintenance on the part of the mini-ISPs. Because the proxy server is connected to the mini-ISP, the tables as to which IP addresses and news groups to be block may be updated continually via a download from the NOC 4. In this manner, the mini-ISP can provide a much better filtering function which only blocks obscene materials while passing materials (e.g., breast cancer research) which is not of an obscene nature. Further, the mini-ISP and/or the terminal 2/settop 39 may provide a logging function whereby all web surfing as well as channel surfing is recorded and may be downloaded remotely and/or viewed locally.

Gateway Load Balancing

Figure 14:
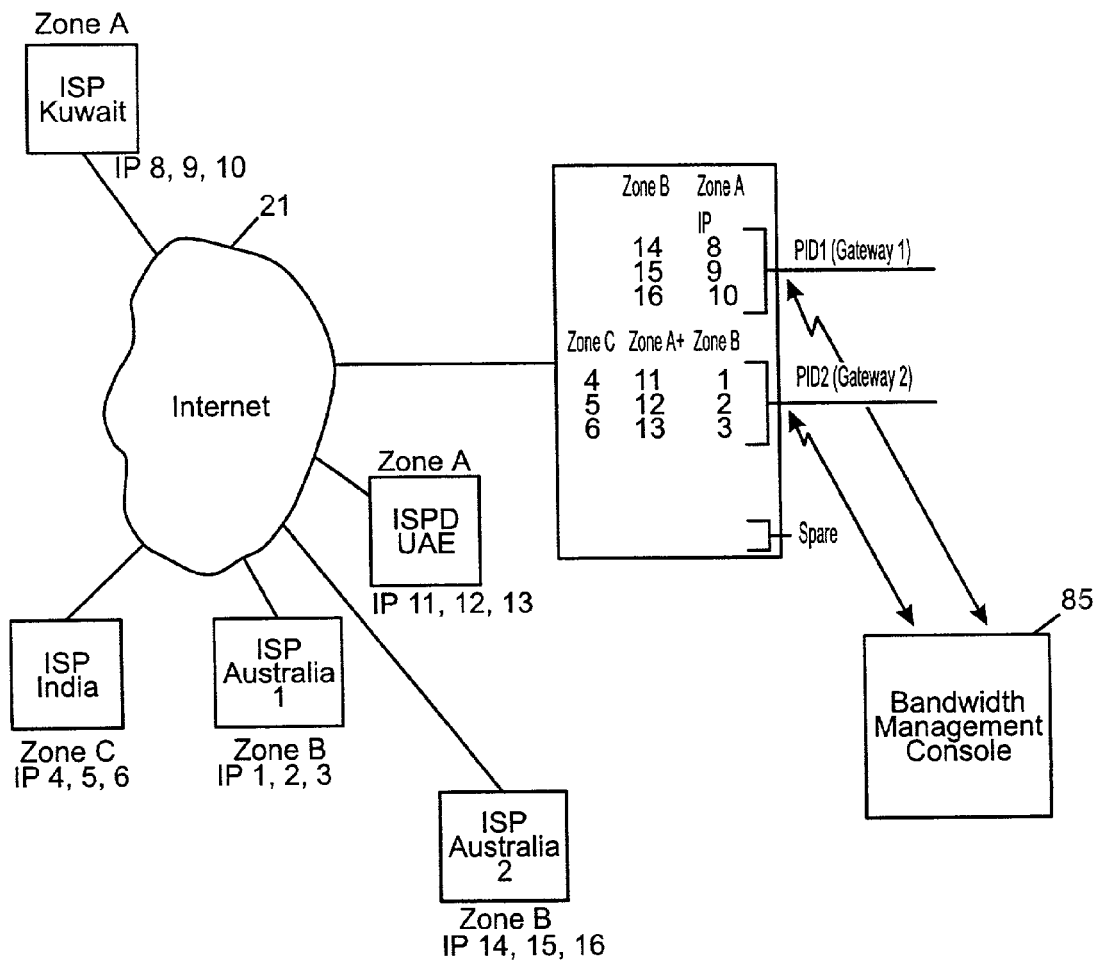
FIG. 14 illustrates operations of the bandwidth management console in accordance with the present invention.

Referring to FIG. 7, bandwidth through the NOC 4 may be allocated among a number of gateways. In this way, no gateway becomes overloaded during normal cycles in the operation of the NOC 4. Various mechanisms may be utilized to distribute bandwidth among a plurality of gateways in the NOC 4. For example, as shown in FIG. 14, bandwidth required by hosts within a single time zone may be allocated such that IP addresses and associated PIDs are evenly distributed across a plurality of gateways 90–93. Within a particular time zone, peak periods of use occur normally during the same hours. Accordingly, maximum efficiency may be achieved by generally evenly distributing ranges of IP addresses across the various gateways which are available at the NOC 4. As shown in FIG. 14, it is preferred to bunch IP addresses from a single ISP to a single gateway. Thus, the failure of a gateway can be easily traced. However, multiple ISP within the same area are preferably distributed to different gateways. For example, referring to FIG. 14, ISPs located in Zone A are mixed with ISPs located in Zone B. In this manner, ISPs associated with Zone A and Zone B are intermixed on the same gateway. Similarly, ISPs located in Zone C may be mixed with ISPs located in Zone A and Zone B. A bandwidth management console 85 may also be utilized to manage the bandwidth and distribution of IP addresses across multiple gateways as shown in FIG. 14.

An alternate technique for distributing bandwidth across the various gateways is to limit the number of terminal devices 2 associated with a particular gateway 90. For example, gateway 1 may be limited to processing requests from IP addresses 8–9 and 14–16. In this manner, the bandwidth management console may monitor the output of the backbone router at each of the gateways to determine whether there is a danger of falling below a committed information rate for any of the IP addresses assigned to a particular gateway. If a problem is likely to occur, the bandwidth management console 87 may reassign an IP range associated with a particular ISP to another gateway. Where a plurality of gateways are utilized, a router may be utilized to allocate bandwidth between the different channels serviced by the different gateways as shown in FIG. 14.

The gateways 90–93 may be limited in speed due to a number of factors such as the serial communication functions of the gateway including MPEG encoding and translation of the IP addresses to PIDs which identify particular terminal devices 2 to which the output packets are addressed.

Roaming

Figure 15:
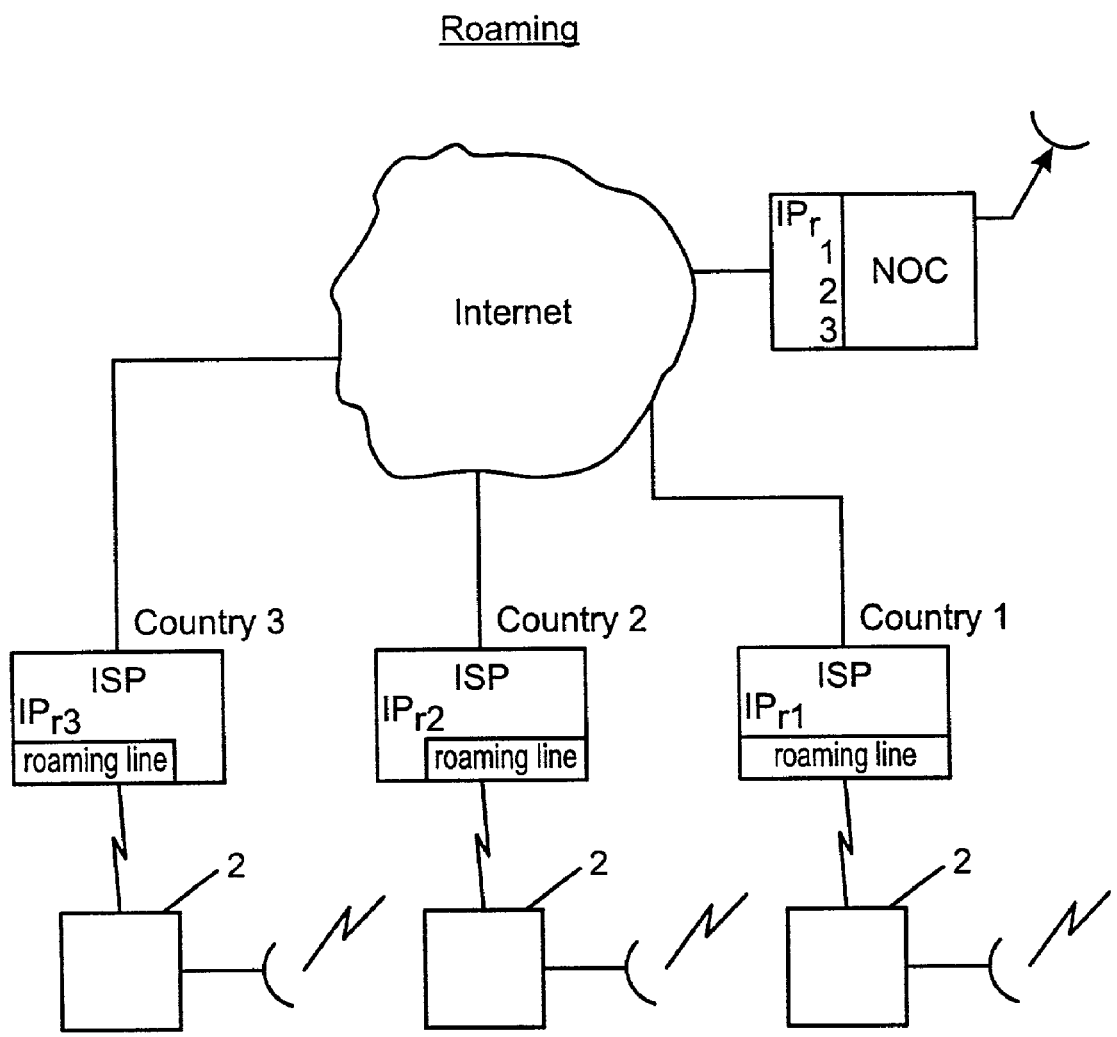
FIG. 15 is a block diagram illustrating the operation of a roaming function in accordance with aspects of the invention.

FIG. 15 provides an overview of a Roaming function which may be employed in embodiments asymmetric Internet system. In a roaming system, an Internet service providers, in each of a plurality of countries, may be assigned a different IP address within a particular range of IP addresses known as an roaming IP range. Thereafter, when a token such as an access card, a Smartcard, a data key, or other device accesses a terminal device in country 1, the token will be assigned a dynamic IP address within the range of the ISP in country 1. When the user moves to country number 2 and may, for example, utilize a terminal in country number 2, such as in a hotel or a portable dish, the user inserts his token and receives a second IP address in the range assigned to the ISP in country number 2. The IP address is negotiated between the terminal device and the Internet service provider. Similarly when the user moves to country 3, a third IP address is negotiated between the terminal device and the ISP and it operates according to the description in the previous two countries.

The token does not need to know about the IP range since it is not required for the negotiations between the terminal device 2 and the ISP. However, the token is preferably configured to be a roaming token which is not associated with a fixed IP address. According, in a roaming configuration, the token is preferably configured such that it can be utilized with any one of the plurality of IP addresses within the range for any selected country. In the roaming system, it is highly advantageous to configure the system such that the token is not associated with a particular IP address. In this manner, the system remains flexible enough to accept any IP address from any of the ISPs while still allowing billing to be associated with the token assigned to a particular user. Although a movable token may be desirable in many situations, the token need not be a physical key. For example where billing is centralized, the token may simply be an ID value and/or password assigned to a particular user. Alternatively, the token may contain an encrypted ID and/or password.

In the preferred embodiment, the roaming lines are separate telephone lines which enable the roaming service to operate and are not part of the conventional telephone access into the ISP associated with conventional dial-up lines. In this way, the roaming lines are an added service for ZakNet users and not associated with use made by conventional users. Thus, an individual subscriber may pay an added fee to have access to roaming lines for all of the ZakNet connected ISPs.

Conditional Access System

Figure 16:
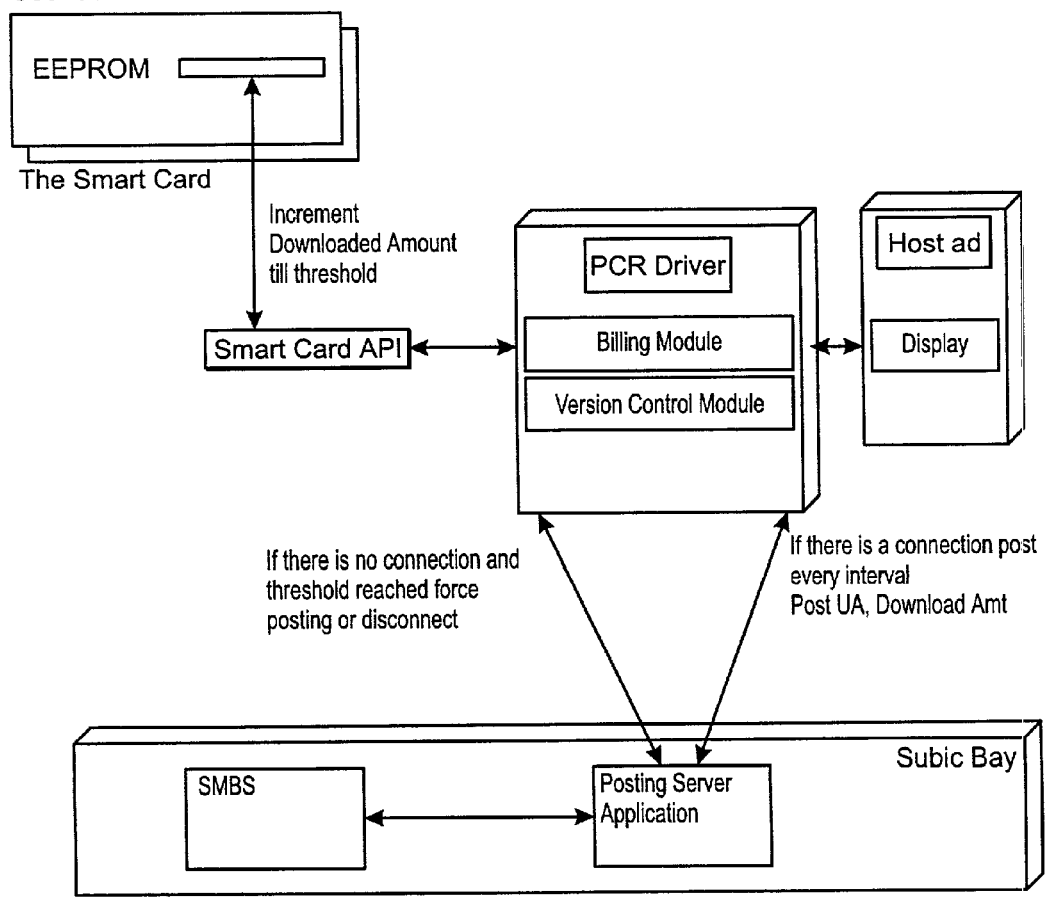
FIG. 16 is a block diagram describing an exemplary conditional access system.
Figure 17:
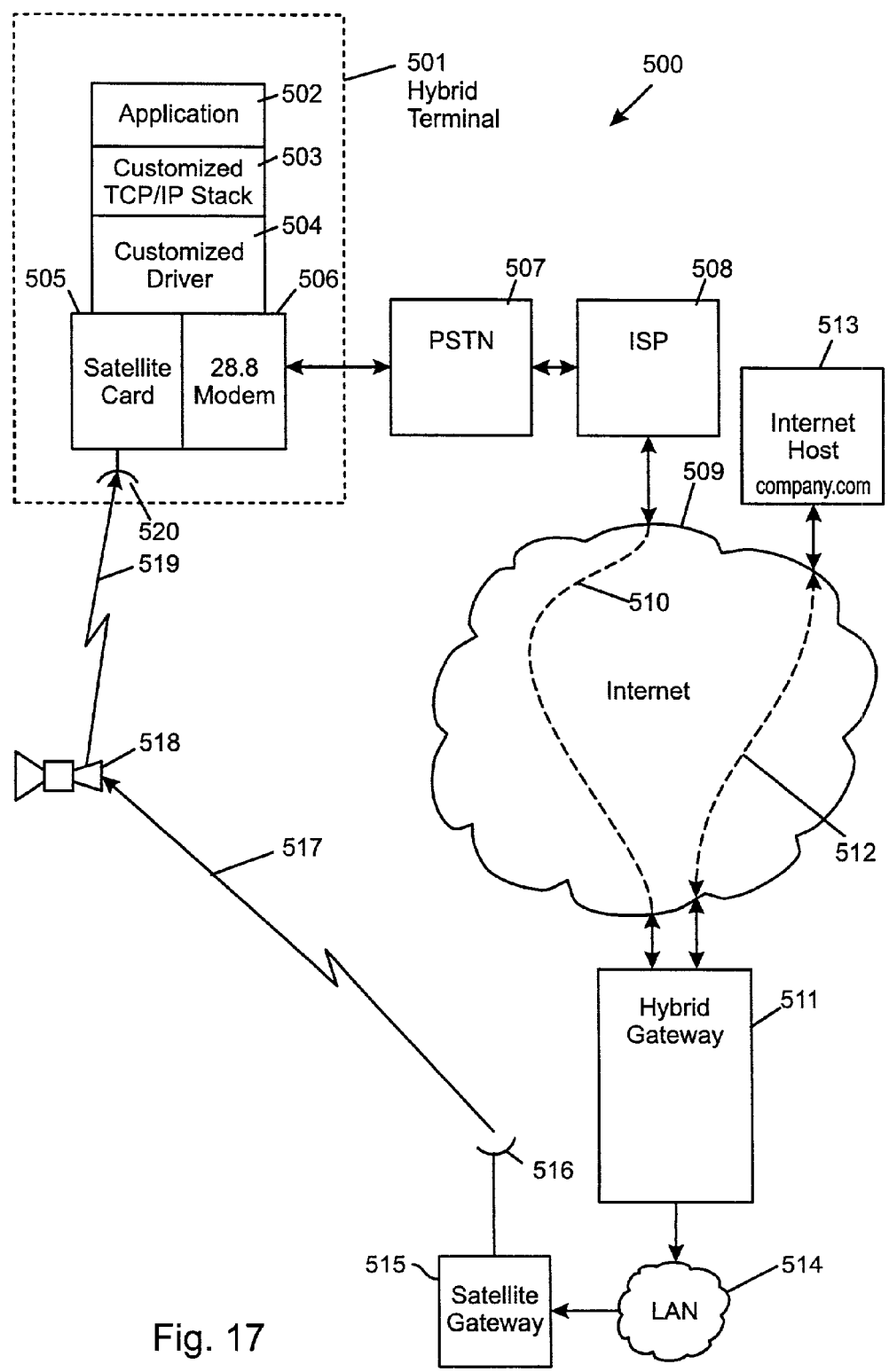
FIG. 17 is a block diagram of a conventional asymmetric Internet access system.

Each of the systems described herein may include one or more conventional conditional access systems. For example, FIG. 16 shows one example of a conventional conditional access system called "VIA Access" which is provided by France Telecommunications Corporation. The conditional access system may include one or more tokens such as a Smartcard on the settop 39 and/or terminal device 2. Where a token is utilized, it may be desirable to include one or more conditional access servers, e.g. 110 and 111, in the NOC 4. The conditional access servers determine access by monitoring user request initiated using, for example, a remote control associated with either the PC and/or settop.

While asymmetric access systems embodying one or more aspects of the present inventions are shown by way of example, it will be understood, of course, that the invention is not limited to these embodiments. Modifications may be made by those skilled in the art, particularly in light of the foregoing teachings. For example, the embodiments of FIGS. 1 to 16 form basic building blocks which may be combined in any suitable arrangement. It is, therefore, intended that the appended claims cover any such modifications which incorporate the features of this invention or encompass the true spirit and scope of the invention. For example, each of the elements of the aforementioned embodiment may be utilized alone or in combination with other elements of the embodiment.

What is claimed is:

1. An asymmetric satellite based terminal device configured to receive Internet data from a satellite using a standard TCP/IP stack, the terminal device comprising:
   a personal computer comprising:
      a modem in communication with an Internet Service Provider (ISP);
      an expansion card based satellite receiver in communication with a Satellite Network Operation Center (NOC), the NOC having a range of satellite IP addresses assigned thereto; and
      an operating system, the operating system including the standard TCP/IP stack;
   a first driver configured to access the expansion card based satellite receiver; and
   a second driver configured to access the modem;
   wherein the first driver is further configured to route data received from the satellite receiver card to the standard TCP/IP stack, the second driver is further configured to route request data from the standard TCP/IP stack to the modem, and the modem is configured to send the request data to the ISP, the request data as sent from the modem having as its source address a satellite source IP address from the range of satellite IP addresses assigned to the NOC, the satellite source IP address not being encapsulated within another source IP address, whereby asymmetric satellite communications is enabled.

2. The asymmetric satellite based terminal device of claim 1, wherein the terminal device is dynamically assigned an IP address from the range of IP addresses assigned to the NOC.

3. The asymmetric satellite based terminal device of claim 1, wherein the terminal device is statically assigned an IP address from the range of IP addresses assigned to the NOC.

4. The asymmetric satellite based terminal device of claim 3, wherein the IP address is associated with a subscriber of satellite service provided via the NOC.

5. The asymmetric satellite based terminal device of claim 4, wherein the terminal device is assigned an IP address from the range of IP addresses assigned to the NOC based on a token.

6. The asymmetric satellite based terminal device of claim 5, wherein the token is in communication with the terminal device and is selected from the group consisting of an access card, a Smartcard, and a data key.

7. The asymmetric satellite based terminal device of claim 5, wherein the token is entered into the terminal device by a user and is selected from the group consisting of an id value, a password, an id value and a password, an encrypted ID, and an encrypted ID and a password.

8. An asymmetric satellite system comprising an asymmetric satellite based terminal device configured to receive Internet data from a satellite using a standard TCP/IP stack, a satellite network operation center (NOC) located at a distance from the asymmetric satellite based terminal device and having a range of satellite IP addresses assigned thereto, and an Internet having a plurality of remote hosts, wherein the terminal device is configured to send web page request data to the remote hosts via a modem with the request data source address being a source address of the network operations center, the source address comprising a satellite IP address from the range of IP addresses assigned to the NOC, the satellite source IP address not being encapsulated within another source IP address.

9. The asymmetric satellite system of claim 8 wherein the network operation center is configured to encapsulate data output to the asymmetric satellite based terminal device from the network operation center in MPEG II packets.

10. The asymmetric satellite system of claim 9 wherein the data includes WEB pages.

11. The asymmetric satellite system of claim 8, further comprising an Internet Service Provider (ISP) connected between the terminal device and the Internet, wherein the ISP is configured to assign to the terminal device an IP address associated with the network operations center.

12. The asymmetric satellite system of claim 11, wherein the ISP has a plurality of available IP addresses assigned to the network operations center and is configured to dynamically assign an available IP address of the plurality of available IP addresses to the terminal device.

13. The asymmetric satellite system of claim 11, wherein the ISP is configured to statically assign the IP address to the terminal device based on the identity of a user of the terminal device.

14. The asymmetric satellite system of claim 11, wherein the ISP is configured to assign the IP address based on a token.

15. The asymmetric satellite based terminal device of claim 14, wherein the token is in communication with the terminal device and is selected from the group consisting of an access card, a Smartcard, and a data key.

16. The asymmetric satellite based terminal device of claim 14, wherein the token is entered into the terminal device by a user and is selected from the group consisting of an id value, a password, an id value and a password, an encrypted ID, and an encrypted ID and password.

17. The asymmetric satellite system of claim 8, wherein a first host of the remote hosts is connected to the terminal device via a first hop on a terrestrial link, a second host of the remote hosts is connected to the terminal device via a second hop on the terrestrial link, and an ISP is configured to return data from the first host to the terminal device via the terrestrial link and to return data from the second host to the terminal device via a satellite link.

18. An asymmetric satellite system comprising a satellite network operations center having a range of satellite IP addresses assigned thereto, an Internet having a plurality of hosts, and a terminal device located at a distance from the network operations center and configured to utilize an IP address belonging to the network operations center such that access requests across the Internet are returned to the network operations center, wherein the terminal device includes a personal computer having a modem, an expansion card based satellite receiver, and an operating system, the operating system including the standard TCP/IP stack, and an application program for assigning the IP address as a source address of the terminal device, wherein the terminal device is configured to issue requests for web pages via a modem with the request source address being a source address of the network operations center, the source address comprising a satellite IP address from the range of IP addresses assigned to the network operations center, the satellite source IP address not being encapsulated within another source IP address.

19. An asymmetric satellite based terminal device configured to utilize an IP address belonging to a satellite network operations center (NOC), the NOC having a range of satellite IP addresses assigned thereto, the asymmetric satellite based terminal device including a personal computer having a modem, an expansion card based satellite receiver, and an operating system, the operating system including the standard TCP/IP stack, and an application program for assigning the IP address as a source address of the asymmetric satellite based terminal device, wherein the asymmetric satellite based terminal device is configured to issue requests for web pages via a modem with the request source address being a source address of the network operations center, the source address comprising a satellite IP address from the range of IP addresses assigned to the NOC, the satellite source IP address not being encapsulated within another source IP address.

20. An asymmetric satellite based terminal device comprising:
a modem in communication with an Internet Host via a terrestrial link;
a satellite card in communication with an Internet Host via a satellite link;
a storage device having computer-readable instructions stored thereon for performing steps comprising:
creating a data packet having as its IP source address an address assigned to a centralized uplink center of a satellite service, the IP source address not being encapsulated within another source IP address; and
sending the data packet from the modem to the Internet Host via the terrestrial link in its unencapsulated form.

21. The asymmetric satellite based terminal device of claim 20, wherein the storage device further includes instructions for performing the step of receiving data at the satellite card from the Internet Host via the satellite link in response to the data packet being sent from the modem.

22. The asymmetric satellite based terminal device of claim 21, wherein the Internet Host is connected to the modem via a first hop on the terrestrial link, and the storage device further includes instructions for performing the step of receiving data at the modem from the Internet Host via the terrestrial link in response to the data packet being sent from the modem.

23. A method for providing asymmetric satellite based service to a terminal device, the method comprising:
creating a data packet having as its IP source address a source address assigned to a centralized uplink center of a satellite network, the source IP address not being encapsulated within another IP source address; and
sending the data packet in its unencapsulated form from a modem of the terminal device to an Internet Host via a terrestrial link.

24. The method of claim 23, further comprising, in response to the step of sending, receiving response data at the terminal device from the Internet Host via a satellite link.

25. The method of claim 23, wherein the Internet Host is connected to the terminal device via a first hop on the terrestrial link, the method further comprising receiving response data at the terminal device from the Internet Host via the terrestrial link in response to the step of sending.

26. The method of claim 23, further comprising assigning an IP address assigned to an uplink center of a satellite network to the terminal device, wherein, for the step of creating, the source address matches the IP address assigned to the uplink center.

27. A computer-readable medium having computer-readable instructions stored thereon for performing steps comprising:
creating a data packet having as its IP source address a source address assigned to a centralized uplink center of a satellite service the IP source address not being encapsulated within another IP source address; and
sending the data packet in its unencapsulated form from a modem of an asymmetric satellite based terminal device to an Internet Host via a terrestrial link.

28. The computer-readable medium of claim 27 including further computer-readable instructions for performing the step of receiving data at the terminal device from the Internet Host via a satellite link in response to the data packet being sent from the modem.

29. The computer-readable medium of claim 27 including further computer-readable instructions for performing the step of assigning an IP address assigned to an uplink center of a satellite network to the terminal device, wherein, for the step of creating, the source address matches the IP address assigned to the uplink center.

30. An asymmetric satellite based terminal device configured to receive Internet data from a satellite using a standard TCP/IP stack, the terminal device comprising:
a personal computer comprising:
a modem in communication with an Internet Service Provider (ISP);
an expansion card based satellite receiver in communication with a Network Operation Center (NOC), the NOC having a range of IP addresses assigned thereto, the receiver having an Internet broadcast IP address from the range of IP addresses assigned to the NOC; and
an operating system, the operating system including the standard TCP/IP stack;

a first driver configured to access the expansion card based satellite receiver; and a second driver configured to access the modem;

wherein the first driver is further configured to route data received from the satellite receiver card to the standard TCP/IP stack, the second driver is further configured to route request data from the standard TCP/IP stack to the modem, and the modem is configured to send the request data to the ISP, the request data as sent from the modem having, as an IP source address unencapsulated within another IP source address, the Internet broadcast IP address of the receiver, whereby asymmetric satellite communications is enabled.

31. The asymmetric satellite terminal device of claim 30, wherein the terminal device is configured to send web page request data to remote hosts with the return address as the Internet broadcast IP address.

32. The asymmetric satellite system of claim 31 wherein the data includes WEB pages.

33. The asymmetric satellite system of claim 31, further comprising an Internet Service Provider (ISP) connected between the terminal device and the Internet, wherein the ISP is configured to assign to the terminal device the Internet broadcast IP address associated with the network operations center.

34. The asymmetric satellite system of claim 33, wherein the ISP has a plurality of available Internet broadcast IP addresses assigned to the network operations center and is configured to dynamically assign an available Internet broadcast IP address of the plurality of available Internet broadcast IP addresses to the terminal device.

35. The asymmetric satellite system of claim 33, wherein the ISP is configured to statically assign the Internet broadcast IP address to the terminal device based on the identity of a user of the terminal device.

36. The asymmetric satellite system of claim 33, wherein the ISP is configured to assign the Internet broadcast IP address based on a token.

37. The asymmetric satellite based terminal device of claim 36, wherein the token is in communication with the terminal device and is selected from the group consisting of an access card, a Smartcard, and a data key.

38. The asymmetric satellite based terminal device of claim 37, wherein the token is entered into the terminal device by a user and is selected from the group consisting of an id value, a password, an id value and a password, an encrypted ID, and an encrypted ID and password.

39. The asymmetric satellite system of claim 30 wherein the network operation center is configured to encapsulate data output to the asymmetric satellite based terminal device from the network operations center in MPEG II packets.

40. The asymmetric satellite system of claim 30 wherein the terminal device includes an application program for assigning the source Internet broadcast IP address from the range of IP addresses as a return address of the terminal device, wherein the terminal device is configured to issue requests for web pages with a return address of the network operations center.

41. The asymmetric satellite based terminal device of claim 30, wherein the terminal device is dynamically assigned the Internet broadcast IP address from the range of IP addresses assigned to the NOC.

42. The asymmetric satellite based terminal device of claim 30, wherein the terminal device is statically assigned the Internet broadcast IP address from the range of IP addresses assigned to the NOC.

43. The asymmetric satellite based terminal device of claim 42, wherein the Internet broadcast IP address is associated with a subscriber of satellite service provided via the NOC.

44. The asymmetric satellite based terminal device of claim 43, wherein the terminal device is assigned the Internet broadcast IP address from the range of IP addresses assigned to the NOC based on a token.

45. The asymmetric satellite based terminal device of claim 44, wherein the token is in communication with the terminal device and is selected from the group consisting of an access card, a Smartcard, and a data key.

46. The asymmetric satellite based terminal device of claim 44, wherein the token is entered into the terminal device by a user and is selected from the group consisting of an id value, a password, an id value and a password, an encrypted ID, and an encrypted ID and a password.

47. The asymmetric satellite system of claim 30, wherein a first host of the remote hosts is connected to the terminal device via a first hop on a terrestrial link, a second host of the remote hosts is connected to the terminal device via a second hop on the terrestrial link, and the ISP is configured to return data from the first host to the terminal device via the terrestrial link and to return data from the second host to the terminal device via a satellite link.

* * * * *